US012305733B2

(12) United States Patent
Laird et al.

(10) Patent No.: US 12,305,733 B2
(45) Date of Patent: May 20, 2025

(54) ADJUSTABLE SHOCK ASSEMBLY

(71) Applicant: Fox Factory, Inc., Duluth, GA (US)

(72) Inventors: Andrew Laird, Seattle, WA (US); Everet Owen Ericksen, Woodland, CA (US)

(73) Assignee: Fox Factory, Inc., Duluth, GA (US)

( * ) Notice: Subject to any disclaimer, the term of this patent is extended or adjusted under 35 U.S.C. 154(b) by 366 days.

(21) Appl. No.: 17/841,450

(22) Filed: Jun. 15, 2022

(65) Prior Publication Data

US 2022/0403909 A1 Dec. 22, 2022

Related U.S. Application Data

(60) Provisional application No. 63/211,217, filed on Jun. 16, 2021.

(51) Int. Cl.
| | |
|---|---|
| *F16F 9/44* | (2006.01) |
| *B62K 25/28* | (2006.01) |
| *F16F 9/19* | (2006.01) |
| *F16F 9/34* | (2006.01) |
| *F16F 9/348* | (2006.01) |

(Continued)

(52) U.S. Cl.
CPC .............. *F16F 9/44* (2013.01); *F16F 9/19* (2013.01); *F16F 9/3488* (2013.01); *F16F 9/50* (2013.01); *B62K 2025/044* (2013.01); *B62K 25/286* (2013.01); *F16F 2222/12* (2013.01); *F16F 2222/126* (2013.01); *F16F 2228/066* (2013.01); *F16F 2230/18* (2013.01); *F16F 2230/186* (2013.01); *F16F 2232/08* (2013.01)

(58) Field of Classification Search
CPC .... F16F 9/44; F16F 9/19; F16F 9/3488; F16F 9/50; F16F 2222/12; F16F 2222/126; F16F 2228/066; F16F 2230/18; F16F 2230/186; F16F 2232/08; B62K 25/286; B62K 2025/044

See application file for complete search history.

(56) References Cited

U.S. PATENT DOCUMENTS

| | | | | |
|---|---|---|---|---|
| 6,032,933 | A | * 3/2000 | Beck ................. | B60G 17/044 188/289 |
| 6,491,146 | B1 | * 12/2002 | Yi ........................ | F16F 9/44 188/322.15 |

(Continued)

FOREIGN PATENT DOCUMENTS

EP 3354928 A1 8/2018

OTHER PUBLICATIONS

European Search Report for EP Application 22179495.1, Dated Dec. 1, 2022, 7 Pages.

*Primary Examiner* — Bradley T King
*Assistant Examiner* — James K Hsiao

(57) ABSTRACT

An adjustable shock assembly is disclosed herein. The adjustable shock assembly includes a damper body having a main chamber with a working fluid therein. An adjustable active valve assembly comprising: a first parallel flow pathway comprising an active valve; and a second parallel flow pathway comprising a firm mode blowoff stack and a firm mode adjuster to adjust a blowoff pressure of the firm mode blowoff stack. A main piston coupled with a piston shaft, and a fluid pathway fluidly coupling the main chamber with the adjustable active valve assembly which is fluidly coupled with a reservoir.

20 Claims, 7 Drawing Sheets

(51) Int. Cl.
 *F16F 9/50* (2006.01)
 *B62K 25/04* (2006.01)

(56) References Cited

U.S. PATENT DOCUMENTS

| | | | |
|---|---|---|---|
| 7,374,028 B2 | 5/2008 | Fox | |
| 7,484,603 B2* | 2/2009 | Fox | B62K 25/08 |
| | | | 188/314 |
| 7,635,051 B2* | 12/2009 | Beck | F16F 9/3235 |
| | | | 188/322.19 |
| 8,838,335 B2* | 9/2014 | Galasso | B60G 17/0424 |
| | | | 280/755 |
| 8,955,653 B2 | 2/2015 | Marking | |
| 9,091,319 B2* | 7/2015 | Ishii | F16F 9/466 |
| 9,239,090 B2* | 1/2016 | Marking | B60G 17/08 |
| 9,303,712 B2 | 4/2016 | Cox | |
| 9,353,818 B2 | 5/2016 | Marking | |
| 9,452,654 B2* | 9/2016 | Ericksen | F16F 9/5126 |
| 9,682,604 B2 | 6/2017 | Cox et al. | |
| 9,797,467 B2 | 10/2017 | Wootten et al. | |
| 9,810,281 B2* | 11/2017 | Mori | F16F 9/465 |
| 9,874,263 B2* | 1/2018 | Noguchi | F16F 9/585 |
| 10,036,443 B2* | 7/2018 | Galasso | F16F 9/3264 |
| 10,415,662 B2 | 9/2019 | Marking | |
| 10,443,671 B2 | 10/2019 | Marking | |
| 10,677,309 B2* | 6/2020 | Ericksen | F16F 9/3405 |
| 10,697,514 B2* | 6/2020 | Marking | F16F 9/46 |
| 10,737,546 B2* | 8/2020 | Tong | F16F 9/065 |
| 2012/0018263 A1* | 1/2012 | Marking | F16F 9/065 |
| | | | 188/266.2 |
| 2014/0216870 A1* | 8/2014 | Nakajima | F16F 9/464 |
| | | | 188/280 |
| 2016/0153516 A1* | 6/2016 | Marking | B60G 17/08 |
| | | | 188/281 |
| 2016/0363184 A1* | 12/2016 | Noguchi | F16F 9/062 |
| 2017/0114856 A1* | 4/2017 | Yoshida | F16F 9/585 |
| 2019/0390730 A1* | 12/2019 | Russell | B60G 13/08 |
| 2020/0269647 A1 | 8/2020 | Strickland et al. | |

* cited by examiner

ADJUSTABLE SHOCK ASSEMBLY

CROSS-REFERENCE TO RELATED APPLICATIONS

This application claims benefit of U.S. Provisional Patent Application Ser. Number 63/211,217, filed Jun. 16, 2021, entitled "METHOD AND APPARATUS FOR AN ADJUSTABLE DAMPER" by Laird et al., assigned to the assignee of the present application, which is herein incorporated by reference in its entirety.

FIELD OF THE INVENTION

Embodiments of the invention generally relate to adjustable shock assemblies.

BACKGROUND

Shock assemblies (e.g., dampers, shock absorbers, etc.) are used in numerous different vehicles and configurations to absorb some or all of a movement that is received at an unsprung portion of a vehicle before it is transmitted to a suspended portion of the vehicle. For example, when a wheel hits a pothole, the encounter will cause an impact force on the wheel. However, by utilizing suspension components including one or more shock assemblies, the impact force can be significantly reduced or even absorbed completely before it is transmitted to a person on a seat of the vehicle. However, depending upon the terrain being traversed, it can be valuable to be able to change the amount of shock absorption provided by the shock assembly for personal comfort, vehicle performance, and the like.

BRIEF DESCRIPTION OF THE DRAWINGS

Aspects of the present invention are illustrated by way of example, and not by way of limitation, in the accompanying drawings, wherein.

Figure 1A:
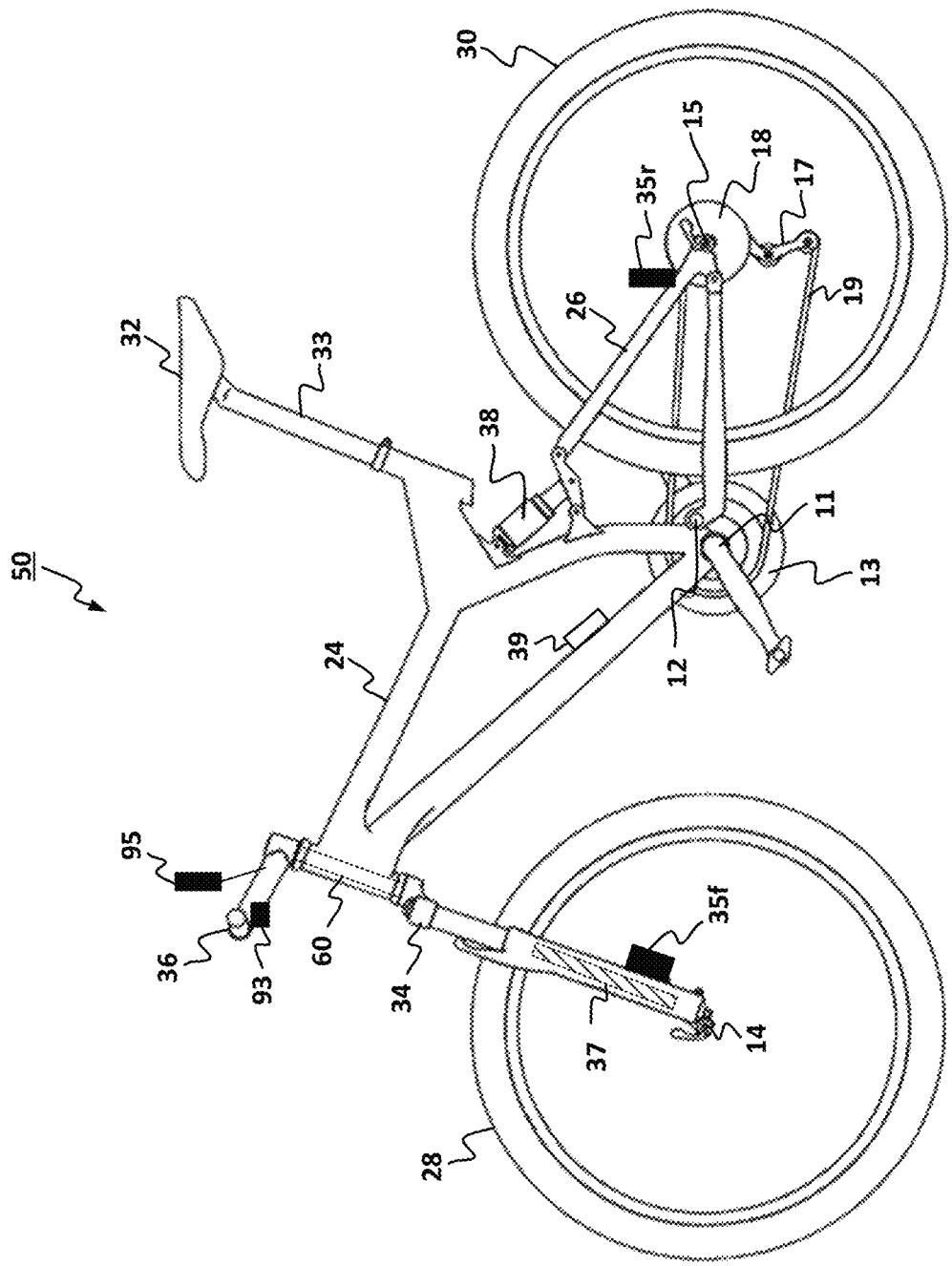
FIG. 1A is a perspective view of a bicycle having an active suspension system and an adjustable shock assembly, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, etc.) with the suspended portion of the vehicle (e.g., seat, cockpit, passenger area, cargo area, etc.). Often, the suspension system will include one or more shock assemblies which are used to reduce feedback from the unsprung portion of the vehicle before that feedback is transferred to the suspended portion of the vehicle, as the vehicle traverses an environment. However, the language used by those of ordinary skill in the art to identify a shock assembly used by the suspension system can differ while referring to the same (or similar) types of components. For example, some of those of ordinary skill in the art will refer to the shock assembly as a shock absorber, while others of ordinary skill in the art will refer to the shock assembly as a damper (or damper assembly).

Described in more detail herein, the adjustable shock assembly often consists of a (damping) piston and piston rod telescopically mounted in a fluid filled cylinder (e.g., a housing). The fluid (e.g., damping fluid, working fluid, etc.) may be, for example, a hydraulic oil, a gas such as nitrogen, air, or the like. In one embodiment, the adjustable shock assembly will include a mechanical spring (e.g., a helically wound spring that surrounds or is mounted in parallel with the body of the adjustable shock assembly). In one embodiment, the adjustable shock assembly will include an air spring. In one embodiment, the adjustable shock assembly will include both a mechanical spring and an air spring.

As used herein, the terms "down", "up", "downward", "upward", "lower", "upper", and other directional references are relative and are used for reference and identification purposes.

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

In an airplane in flight, it is the airframe that is in contact with the surface being traversed (e.g., the air) while a shock assembly and/or other suspension components will be coupled between the airframe and the suspended portion(s) of the vehicle (such as the seats and the like).

The term ride height refers to a distance between a portion of a vehicle and the surface across which the vehicle is traversing. Often, ride height is based on one or more of a number of different measurements such as, but not limited to, a distance between a part of the vehicle and the ground, a measurement between the top of an unsprung portion of a vehicle and a suspended portion of the vehicle there above, etc. For example, a portion of the wheel(s) (or ski, track, hull, etc.) will be in contact with the surface, while one or more adjustable shock assemblies and/or suspension components maintain the suspended portion of the vehicle a certain height there above.

The term initial sag settings or "sag" refers to a predefined vehicle ride height and suspension geometry based on the initial compression of one or more shock assemblies of the suspension system for a given vehicle when it is within its normal load envelope configuration (e.g., with a rider/driver and any initial load weight). Once the sag is established for a vehicle, it will be the designated ride height of the vehicle, until and unless the sag is changed.

The initial sag for a vehicle is usually established by the manufacturer. The vehicle sag can then be modified and/or adjusted by an owner, a mechanic, or the like. For example, an owner can modify the sag to designate a new normal ride height based on a vehicle use purpose, load requirements that are different than the factory load configuration, an adjustment modification and/or replacement of one or more of the suspension components, a change in tire size, a performance adjustment, aesthetics, and the like.

In one embodiment, the initial manufacturer will use sag settings resulting in a pre-established vehicle ride height based on vehicle use, size, passenger capacity, load capacity, and the like. For example, a truck (side-by-side, car, or the like) may have a pre-established sag based on an expected load (e.g., a number of passengers, an expected cargo requirement, etc.).

Regardless of the vehicle type, once the sag is established, in a static situation the ride height of the expectedly loaded vehicle should be at or about the established sag. When in motion, the ride height will change as the vehicle travels over the surface, and while the suspension system is used to reduce the transference of any input forces received from the surface to the rest of the vehicle it is also used to maintain the vehicle's sag.

However, when additional weight is added to the vehicle, the suspension and one or more adjustable shock assemblies will be compressed, and the vehicle ride height will be less than the sag.

Additional information regarding sag and sag setup can be found in U.S. Pat. No. 8,838,335 which is incorporated by reference herein, in its entirety.

As vehicle utilization scenarios change, one or more shock assemblies of the suspension system can be adjusted for different characteristics based on the use type of the vehicle, terrain, purpose (e.g., rock crawl, normal use, race set-up, etc.), and the like. This modification would result in a modified personal sag setting. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its personal sag setting as quickly as possible in preparation for the next encounter.

In contrast, a street bike racer (track racing vehicle, boat/PWC racer, etc.) would want a firmer suspension configuration with a very small range of motion to provide feel for the grip of the tire, maintain friction and/or aerodynamic geometries, and the like, in order to obtain the maximum performance from the vehicle.

In one embodiment, there may be times where changes to a suspension component are desired during a given ride/drive. For example, a bike rider in a sprinting scenario would often want to firm up or possibly even lockout the suspension component to remove the opportunity for rider induced pedal bob. Similarly, a ride/drive from a paved road to an off-road environment (or vice-versa) would also be a time when a change to one or more suspension component settings is valuable.

With respect to the term lockout, for purposes of the following discussion, lockout refers to the most restricted flow state attainable or desirable. Thus, in one embodiment, lockout refers to a stoppage of all fluid flow through a given fluid path. However, in another embodiment, lockout does not stop all the fluid flow through a given fluid path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the adjustable shock assembly has been reduced to a minimum size for a given adjustable shock assembly, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

In the following discussion, the term "active", as used when referring to a valve or shock assembly component, means adjustable, manipulatable, etc., during typical operation of the valve. For example, an active valve can have its operation changed to thereby alter a corresponding shock assembly characteristic damping from a "soft" setting to a "firm" setting (or a stiffness setting somewhere therebetween) by, for example, adjusting a switch in a passenger compartment of a vehicle. Additionally, it will be understood that in some embodiments, an active valve may also be configured to automatically adjust its operation, and corresponding shock assembly damping characteristics, based upon, for example, operational information pertaining to the vehicle and/or the suspension with which the valve is used.

Similarly, it will be understood that in some embodiments, an active valve may be configured to automatically adjust its operation, and corresponding shock assembly damping characteristics, based upon received user input settings (e.g., a user-selected "comfort" setting, a user-selected "sport" setting, and the like). In many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or shock assembly component means manually adjustable, physically manipulatable, etc., without requiring disassembly of the valve, damping component, or shock assembly which includes the valve or damping component. In some instances, the manual adjustment or physical manipulation of the valve, damping component, or shock assembly which includes the valve or damping component, occurs when the valve is in use. For example, a manual valve may be adjusted to change its operation to alter a corresponding shock assembly damping characteristic from a "soft" setting to a "firm" setting (or a stiffness setting somewhere therebetween) by, for example, manually rotating a knob, pushing or pulling a lever, physically manipulating an air pressure control feature, manually operating a cable assembly, physically engaging a hydraulic unit, and the like. For purposes of the present discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g. raise or lower) a wheel with respect to the vehicle. In a "semi-active suspension", no motive force/actuator is employed to adjust move (e.g. raise or lower) a wheel with respect to the vehicle.

Rather, in a "semi-active suspension", the characteristics of the suspension (e.g. the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g. raise or lower) a wheel with respect to the vehicle. As such, it will be understood that an "active valve", as defined above, is well suited for use in a "pure active suspension" or a "semi-active suspension".

Referring now to FIG. 1A, a perspective view of a bicycle 50 having an active suspension system and an adjustable shock assembly 38 is shown in accordance with an embodiment. Although a bicycle is used in the discussion. In one embodiment, the adjustable shock assembly 38 could be used on another vehicle such as, but not limited to a road bike, a mountain bike, a gravel bike, an electric bike (e-bike), a hybrid bike, a scooter, a motorcycle, an ATV, a personal water craft (PWC), a four-wheeled vehicle, a snow mobile, a UTV such as a side-by-side, and the like. In one embodiment, the adjustable shock assembly 38 could be used on a suspension inclusive device such as, but not limited to an exoskeleton, a seat frame, a prosthetic, a suspended floor, and the like.

Thus, between the disclosed examples as provided in view of a bicycle 50, the disclosed embodiments can be used on adjustable shock assemblies used by vehicles with wheels, skis, tracks, hulls, and/or with suspension inclusive devices such as prosthetic limbs, exoskeletons, and the like.

In one embodiment, bicycle 50 has a main frame 24 with a suspension system comprising a swing arm 26 that, in use, is able to move relative to the rest of main frame 24; this movement is permitted by, inter alia, rear adjustable shock assembly 38. The front fork assembly 34 also provide a suspension function via a front shock assembly 37 in at least one fork leg; as such the bicycle 50 is a full suspension bicycle (such as an all-terrain bike (ATB), mountain bike, e-bike, etc.).

However, the embodiments described herein are not limited to use on full suspension bicycles. In particular, the term "suspension system" is intended to include vehicles having front suspension only, rear suspension only, seat suspension only, a combination of two or more different suspensions, and the like.

In one embodiment, swing arm 26 is pivotally attached to the main frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. For example, in a hardtail bicycle embodiment, there would be no pivot point 12. In one embodiment of a hardtail bicycle, main frame 24 and swing arm 26 would be formed as a fixed frame. Bottom bracket axis 11 is the center of the pedal and front sprocket assembly 13. Bicycle 50 includes a front wheel 28, a rear wheel 30 and a seat 32. A seat 32 is connected to the main frame 24 via a seatpost 33 in order to support a rider of the bicycle 50.

Front wheel 28 which is coupled with the front fork assembly 34 via axle 14. The front fork 34 includes a crown and at least one fork leg. Above the crown, a steerer tube 60 passes through a portion of bicycle main frame 24 and attaches the fork 34 to the handlebars 36 (via a stem) allowing the rider to steer the bicycle 50. In one embodiment, at least one active valve damper 37 is integrated with fork 34.

The rear wheel 30 is connected to the swing arm 26 of the frame 22 at rear axle 15. A rear damping assembly (e.g., active valve damper 38) is positioned between the swing arm 26 and the frame 22 to provide resistance to the pivoting motion of the swing arm 26 about pivot point 12. Thus, the illustrated bicycle 50 includes a suspension member between swing arm 26 and the main frame 24 which operate to substantially reduce rear wheel 30 impact forces from being transmitted to the seat 32 (and thus the rider) of the bicycle 50.

In one embodiment, saddle 32 is connected to the main frame 24 via seatpost 33. In one embodiment, seatpost 33 is a dropper seatpost. In one embodiment, front shock assembly 37, rear adjustable shock assembly 38, seatpost 33, handlebar assembly 36, and/or the like include one or more active and/or semi-active damping components which are used to reduce an initial force generated by an event (e.g., imparted to a wheel of the vehicle from the surface on (or through) which the vehicle is traveling) to a lesser force as it is transferred to the rest of the vehicle and/or persons riding therein/thereon.

In one embodiment, bicycle 50 is driven by a chain 19 coupled with both front sprocket assembly 13 and rear sprocket 18. As the front sprocket assembly 13 is rotated about bottom bracket axis 11, a force is applied to chain 19 which transfers the energy from the front sprocket assembly 13 to rear sprocket 18. Chain tension device 17 provides a variable amount of tension on chain 19. The need for chain 19 length variation can be due to factors such as a number of different gears that may be on one or both of front sprocket assembly 13 and/or rear sprocket 18 and/or changes in chain stay length as the distance between bottom bracket axis 11 (where front sprocket assembly 13 attaches to main frame 24) and the rear axle 15 changes due to suspension articulation.

In one embodiment, bicycle 50 includes an active suspension system 75 (shown in FIG. 1B) consisting of a suspension controller 39, one or more sensors (e.g., orientationally flexible bump sensor 35f, 35r, and the like), smart components, mobile device 95, active valve dampers (e.g., adjustable shock assembly 38, front shock assembly 37, a seat post damper, etc.), power source(s), and the like. In one embodiment, sensor 35r is positioned on the swing arm 26 the rear axle 15 of bicycle 50. In one embodiment, sensor 35f is positioned in an unsprung location of front fork 34. Additional information for vehicle suspension systems, sensors, and their components as well as adjustment, modification, and/or replacement aspects including manually, semi-actively, semi-actively, and/or actively controlled aspects and wired or wireless control thereof is provided in U.S. Pat. Nos. 8,838,335; 9,353,818; 9,682,604; 9,797,467; 10,036,443; 10,415,662; the content of which are incorporated by reference herein, in their entirety.

In one embodiment, mobile device 95 is mounted to handlebar assembly 36 of bicycle 50. Although mobile device 95 is shown mounted to handlebar assembly 36, it should be appreciated that the mobile device 95 could be in a rider's backpack, pocket, or the like. In general, mobile device 95 is a smart device such as a mobile phone, tablet, a smart phone, a tablet, a smart watch, a piece of smart jewelry, smart glasses, or other user portable device(s) having wireless connectivity. Mobile device 95 is capable of broadcasting and receiving via at least one network, such as, but not limited to, WiFi, Cellular, Bluetooth, NFC, and the like. In one embodiment, mobile device 95 includes one or more of a display, a processor, memory, a location or position system, (such as a global positioning system (GPS), local positioning system, or the like), camera, and one or more sensors such as audio, visual, motion, acceleration, altitude, and the like.

In one embodiment, switch 93 is mounted to handlebar assembly 36 of bicycle 50. In one embodiment, switch 93 is a positional switch used in conjunction with the active suspension system 75. In one embodiment, switch 93 is a multi-positional switch, an upshift/downshift type of switch, a button type switch, or the like. For example, switch 93 would be a 2-position switch, a 3-position switch, a switch that can cycle through a number of different modes (similar to a gear shift), or the like. Although switch 93 is shown mounted to handlebar assembly 36, it should be appreciated that switch 93 could be mounted in a different location on the vehicle, on a mount coupled to the vehicle, or the like. In one embodiment, the location of switch 93 is modifiable and is located on the vehicle based on a user's preference.

In one embodiment, one or a plurality of component(s) of the bicycle 50 are also smart component(s). Examples of the smart component(s) can include one or more of the forks, wheels, rear shocks, front shocks, handlebars, seat posts, pedals, cranks, and the like. In one embodiment, the smart component(s) will include connective features that allow them to communicate wired or wirelessly with one or more of suspension controller 39, mobile device 95, one or more sensors 35, and/or any other smart component(s) within transmission range (thereby becoming connected components).

In one embodiment, data (including real-time data) is collected or provided from the smart component to the suspension controller 39. Depending upon the connected component, data such as telemetry attributes to provide angle, orientation, velocity, acceleration, RPM, operating temperature, and the like, can be obtained.

Figure 1B:
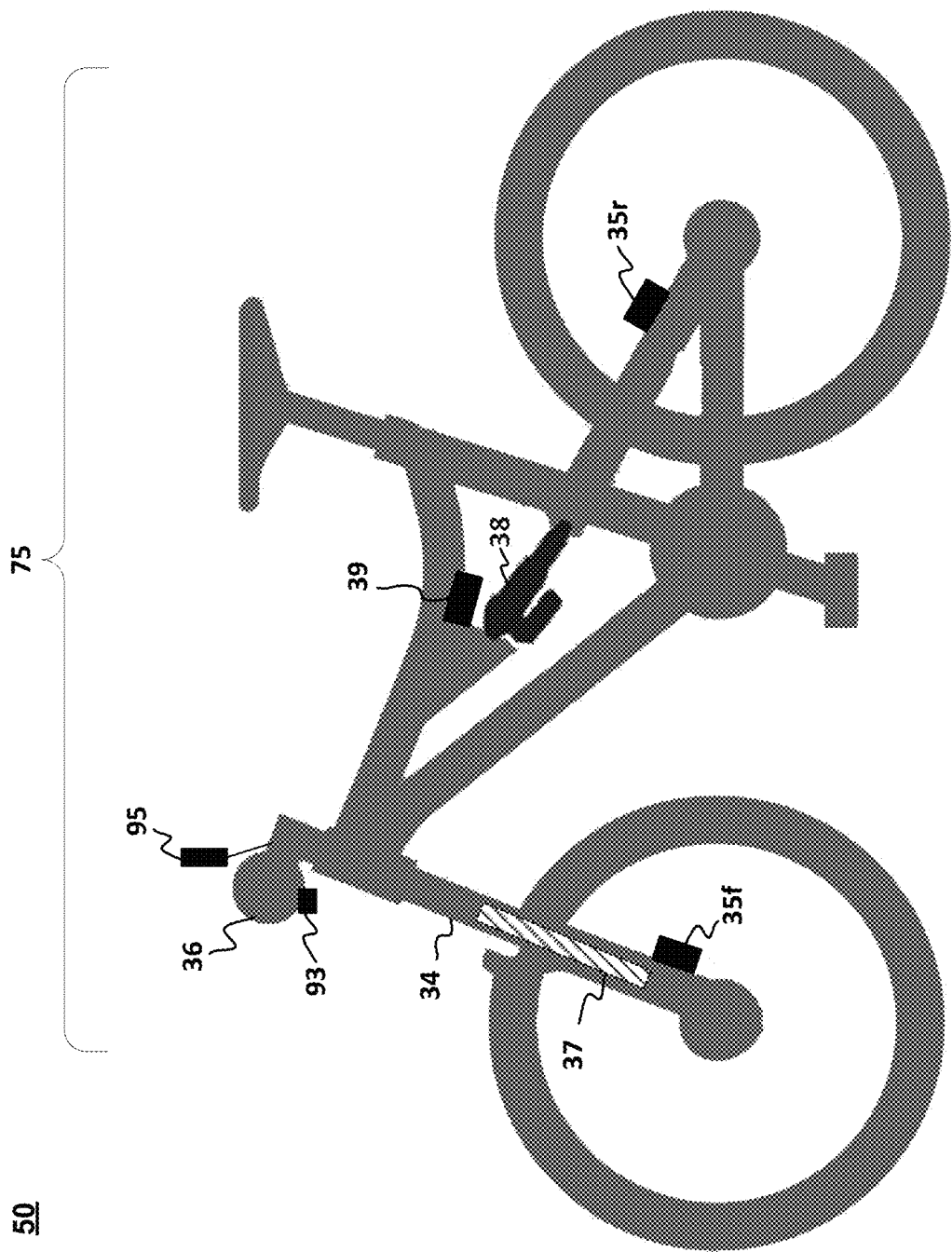
FIG. 1B is a schematic side view of a bicycle with the active suspension system and adjustable shock assembly, in accordance with an embodiment.

Referring now to FIG. 1B, a schematic side view of a bicycle 50 with focus on the active suspension system 75 and adjustable shock assembly 38 (and/or 37) is shown in accordance with an embodiment.

In one embodiment, active suspension system 75 includes suspension controller 39, one or more sensors (e.g., sensor 35f, 35r, and the like), hereinafter "sensor 35", smart components, mobile device 95, active valve dampers (e.g., adjustable shock assembly 38, front shock assembly 37, a seat post damper, etc.), or the like.

In general, sensor 35 could be a single sensor (such as an accelerometer) or a combination of sensor types. Sensor 35 is used for sensing characteristics (or changes to characteristics) such as terrain, environment, temperature, vehicle speed, vehicle pitch, vehicle roll, vehicle yaw, component activity, or the like. It is understood that the one or more sensors may be imbedded, moved, mounted, or the like, in any suitable configuration and allowing for any suitable range of adjustment as may be desirable.

In one embodiment, sensor 35 is a force or acceleration transducer (e.g., strain gage, Wheatstone bridge, accelerometer, hydraulic, interferometer based, optical, thermal or any suitable combination thereof). Further, the sensor 35 may utilize solid state electronics, electro-mechanical principles or MEMS, or any other suitable mechanisms.

In one embodiment, one, some, or all of the components discussed herein including switch 93, sensor 35f, sensor 35r, suspension controller 39, active valves, mobile device 95, and the like are wired and/or wireless and can communicate with one or more of the other components of active suspension system over the wired network, over a wireless network, or over a hybrid wired and wireless network. The wireless network is selected from one or more of: a wireless personal area network (WPAN), a low power network (LPAN), Internet of things (IoT) connectivity, or the like. In one embodiment, the wireless communication protocol could be, but is not limited to, Bluetooth, WiFi, Bluetooth Low Energy (BLE), near field communication (NFC), UHF radio signal, Worldwide Interoperability for Microwave Access (WiMax), long-term evolution (LTE), industrial, scientific, and medical (ISM) band, IEEE 802.15.4 standard communicators, Zigbee, ANT, ISA100.11a (wireless systems for industrial automation: process control and related applications) wireless highway addressable remote transducer protocol (HART), MiWi, IPv6 over low-power wireless personal area networks (6LoWPAN), thread network protocol, subnetwork access protocol (SNAP), and the like.

In one embodiment, one, some, or all of the components discussed herein including switch 93, sensor 35f, sensor 35r, suspension controller 39, active valves, mobile device 95, and the like, could form a wireless mesh, such as a bicycle area network (BAN) or the like. In one embodiment, one or more components of the BAN could interact with the user/rider in any number of ways such as via touch, sound, vision, radio, wearable, and the like.

In one embodiment, the components within the wireless mesh may include an auxiliary or propriety private network encryption. In one embodiment, one or more components within the wireless mesh may include communication protocols for one or more peers, such as an out-of-BAN wireless device that doesn't want to share its network. In this case, the out-of-BAN wireless device can provide a hardware interface and it can be piped into the BAN. Thus, in one embodiment, the wireless mesh network can be used to connect and/or control almost any wireless aspect, as the network, topology, and features thereof are well suited to interacting with basic device operating structures.

In one embodiment, information broadcast from a given component will include a unique identifier (ID) that identifies the specific component that made the broadcast. Thus, even when a number of different components are operating in the same environment, the suspension controller 39 will be able to identify which component sent the signal based on the unique ID. In one embodiment, the unique ID is used during the programming/pairing of the components with suspension controller 39 and/or the network.

In one embodiment, the unique ID is used by suspension controller 39 to validate the sending component. Although a unique ID is used in one embodiment, in another embodiment, a different identification methodology may be used to identify the different components in the network. In one embodiment, the wireless network is an intra-vehicle wireless network (such as a BAN) for data transmission between at least two components coupled with the vehicle, the at least two components including, but not limited to, at least one sensor, the suspension controller, and at least one peripheral device (such as a smart component, switch, or the like) coupled with the vehicle. In one embodiment, the intra-vehicle wireless network is a wireless mesh network. In one embodiment, the intra-vehicle wireless network includes an intra-vehicle transmission authentication and encryption protocol.

In one embodiment, the broadcast information or data (e.g., message payload) will include additional information/data comprising the wireless network which is passed to and from peripheral devices in the network. Thus, in one embodiment, the wireless network communication and/or wireless mesh network will allow for information/data to be exchanged between adjacent vehicles, vehicle networks, etc.

In one embodiment, the wireless network includes an inter-vehicle communication (IVC) wireless network for data transmission between the vehicle and at least another vehicle, between the vehicle and a mobile communications device distinct from the vehicle, between the vehicle and an infrastructure component (such as a traffic light, beacon on a stop sign, road mile marker, a benchmark, or the like). In one embodiment, the IVC wireless network is a wireless mesh network. In one embodiment, the IVC wireless network includes an IVC transmission authentication and encryption protocol.

The IVC transmission authentication and encryption protocol can be distinct and different from the intra-vehicle transmission authentication and encryption protocol, such that a device receiving a communication can determine the origin of the communication. Often, the origin of the communication is important depending upon the data provided in the communication. For example, a transmission that includes sensor provided information might only be verified and acted upon if it includes the intra-vehicle transmission authentication and encryption protocol (such as for security purposes or the like).

In one embodiment, the IVC transmission authentication and encryption protocol can include levels of trust. For example, a vehicle used by a friend may have a "trusted" IVC transmission authentication and encryption protocol that allows a sensor from the friend's vehicle to provide sensor data to the user's suspension controller that is verified and acted upon as sensor data from a "trusted" peripheral. In contrast, when an IVC transmission includes sensor provided information but it does not have a "trusted" IVC transmission authentication and encryption protocol it would not be verified and acted upon. However, other information such as stop sign warnings, terrain changing information, or the like from IVC transmissions would be evaluated by the suspension controller and may be used depending upon context, or the like.

In one embodiment, the sensors 35 of active suspension system 75 provides the obtained sensor data to a suspension controller 39 which uses the sensor data to make suspension adjustments. In one embodiment, suspension controller 39 makes suspension adjustments to adjustable shock assembly 38, front shock assembly 37, or the like.

In one embodiment, location data from a position system is used in conjunction with terrain data to determine probability of obstacles (e.g., to provide a priori knowledge) which is used to optimize the suspension configuration. For example, GPS location information and a terrain database (or the like) is used to establish the bicycle's current location and the terrain about the location (e.g., on a bumpy patch of trail, etc.).

In one embodiment, suspension controller 39 monitors the sensor(s) 35 for sensor input (and/or the location and terrain data, etc.) and make suspension adjustments in a matter of milliseconds after receiving the sensor data. For example, in one embodiment, sensors on the fork, rear axle, and/or main frame read bump input at the wheel and send the obtained sensor data to the suspension controller 39. Thus, by placing sensors on the frame and/or in unsprung location for both wheels, the suspension controller 39 processes data from the terrain to constantly adjust the suspension for maximum efficiency and control.

In one embodiment, the power source for one, some, or all of the suspension controller 39, sensors 35, active valves in the adjustable shock assembly 38 and front shock assembly 37, and the like can be a replaceable battery, a rechargeable battery, a combination thereof, and the like. In one embodiment, the power source is a lithium-ion battery. In one embodiment, the power source is a CR2032 battery. In one embodiment, the power source is a different type of non-rechargeable battery.

In one embodiment, the power source is a rechargeable battery. In one embodiment, the power source can be recharged wired or wirelessly. For example, a power source having a wirelessly rechargeable capability means it could be charged using a wireless power transfer system. E.g., using an inductive charger (or the like) within a given distance of the wirelessly rechargeable capability of the battery. Examples of a wireless power transfer systems that could be used in one or more embodiments include those defined by the wireless power consortium (WPC) Qi standard, the AirFuel Alliance (e.g., Duracell Powermat, PowerKiss, etc.), WiTricity, and the like.

In one embodiment, the power source is an energy harvesting switch that does not require a battery or other powered connection. As such, the energy harvesting switch is capable of operating for an indefinite amount of time without requiring any type of recharge, battery change, etc. For example, in one embodiment, the energy harvesting switch utilizes a momentary generator such as ZF electronics AFIG-0007 to provide power.

Although a number of sensors are shown in FIGS. 1A and 1B, it should be appreciated that there may be only a single sensor or two or more sensors in operation. Moreover, in one embodiment, mobile device 95 is part of the active suspension system 75.

In general, the one or more sensors may be attached to the swing arm 26 directly, to any link thereof, to an intermediate mounting member, to front fork 34, to adjustable shock assembly 38, seat 32, handlebar assembly 36, or to any other portion or portions of the bicycle 50 as may be useful, available, or the like. In one embodiment, one or more sensors and valve actuators (e.g. electric solenoid or linear motor type—note that a rotary motor may also be used with a rotary actuated valve), suspension components, suspension component controller(s) and/or data processing system(s), and the like may be coupled to and/or integrated with the vehicle structure, such as disclosed in U.S. Pat. Nos. 7,484,603; 8,838,335; 8,955,653; 9,303,712; 10,036,443; 10,060,499; 10,443,671; and 10,737,546; the content of which is incorporated by reference herein, in its entirety. Further, sensors and valves, or principles, of patents and other documents incorporated herein by reference, may be integrated one or more embodiments hereof, individually or in combination.

Adjustable Shock Assembly

Figure 2:
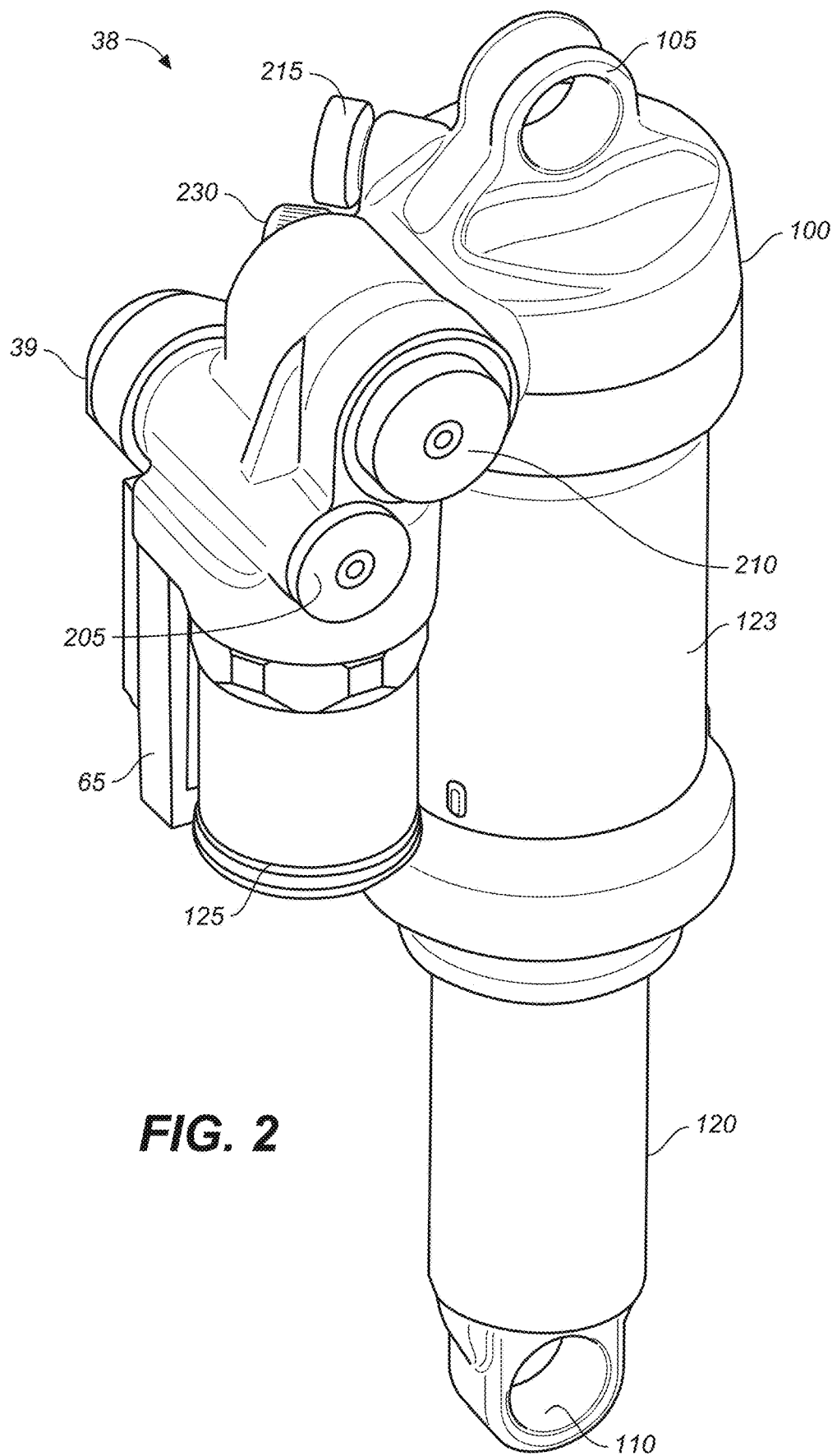
FIG. 2 is a perspective view of an adjustable shock assembly, in accordance with an embodiment.

With reference now to FIG. 2, a perspective view of adjustable shock assembly 38 is shown in accordance with one embodiment. In one embodiment, adjustable shock assembly 38 includes a top cap portion 100, shaft end eyelet 105, lower eyelet 110, damper body 120, air sleeve 123, and reservoir 125. In FIG. 2, reservoir 125 is shown as an external or piggyback type of reservoir. However, in another embodiment, reservoir 125 may be an internal reservoir. The use of an external reservoir is provided merely for purposes of clarity.

In one embodiment, adjustable shock assembly 38 has a controller 39 and power source 65 coupled therewith. In one embodiment, the power source 65 is integrated with controller 39. In one embodiment, power source 65 is separate from controller 39. In one embodiment, by providing controller 39 and power source 65 on the shock assembly 38, shock assembly 38 becomes a self-contained active valve adjustable shock assembly. In one embodiment, adjustable shock assembly 38 may include one or more sensors such that information from the sensors can be provided to controller 39 providing a fully self-contained active adjustable shock assembly 38.

In one embodiment, controller 39 is similar to the controller 39 described herein. In one embodiment, power source 65 is similar to the power sources described herein. For example, it may be a replaceable battery, a rechargeable battery, an e-bike battery, or combination thereof, and the like. In one embodiment, power source 65 is a lithium-ion battery. In one embodiment, power source 65 is a CR2032 battery. In one embodiment, the power source is a different type of non-rechargeable battery.

In one embodiment, power source 65 is a rechargeable battery which can be recharged wired or wirelessly. In one embodiment, power source 65 is an energy harvesting switch that does not require a battery or other powered connection. For example, in one embodiment, power source 65 is a momentary generator such as ZF electronics AFIG-0007.

In one embodiment, adjustable shock assembly 38 includes one or more adjustable features such as, but not limited to, a pneumatic valve 230 (e.g., a Shrader valve, Presta valve, Dunlop valve, or the like), an adjustable active valve assembly 205, a compression adjuster 210, and an adjustable rebound valve assembly 215. In one embodiment, adjustable shock assembly 38 includes each of the pneumatic valve 230, the adjustable active valve assembly 205, the compression adjuster 210, and the adjustable rebound valve assembly 215.

In one embodiment, adjustable shock assembly 38 may include fewer components, e.g., adjustable shock assembly 38 may not include most, some, or one of the top cap portion 100, shaft end eyelet 105, damper body 120, reservoir 125, pneumatic valve 230, adjustable active valve assembly 205, compression adjuster 210, and adjustable rebound valve assembly 215.

In its basic form, adjustable shock assembly 38 controls the speed of movement of the piston shaft 130 (of FIG. 3) by metering incompressible fluid from one side of the main piston 131 (of FIG. 3) to the other, and additionally from the main chamber 121 (of FIG. 3) to the reservoir 125, during a compression stroke (and in reverse during the rebound or extension stroke) to account for the added piston shaft 130 volume.

In one embodiment, the adjustable shock assembly 38 is a stand-alone fluid damper assembly, a coil sprung adjustable shock assembly, an air sprung fluid damper assembly, or the like.

Figure 3:
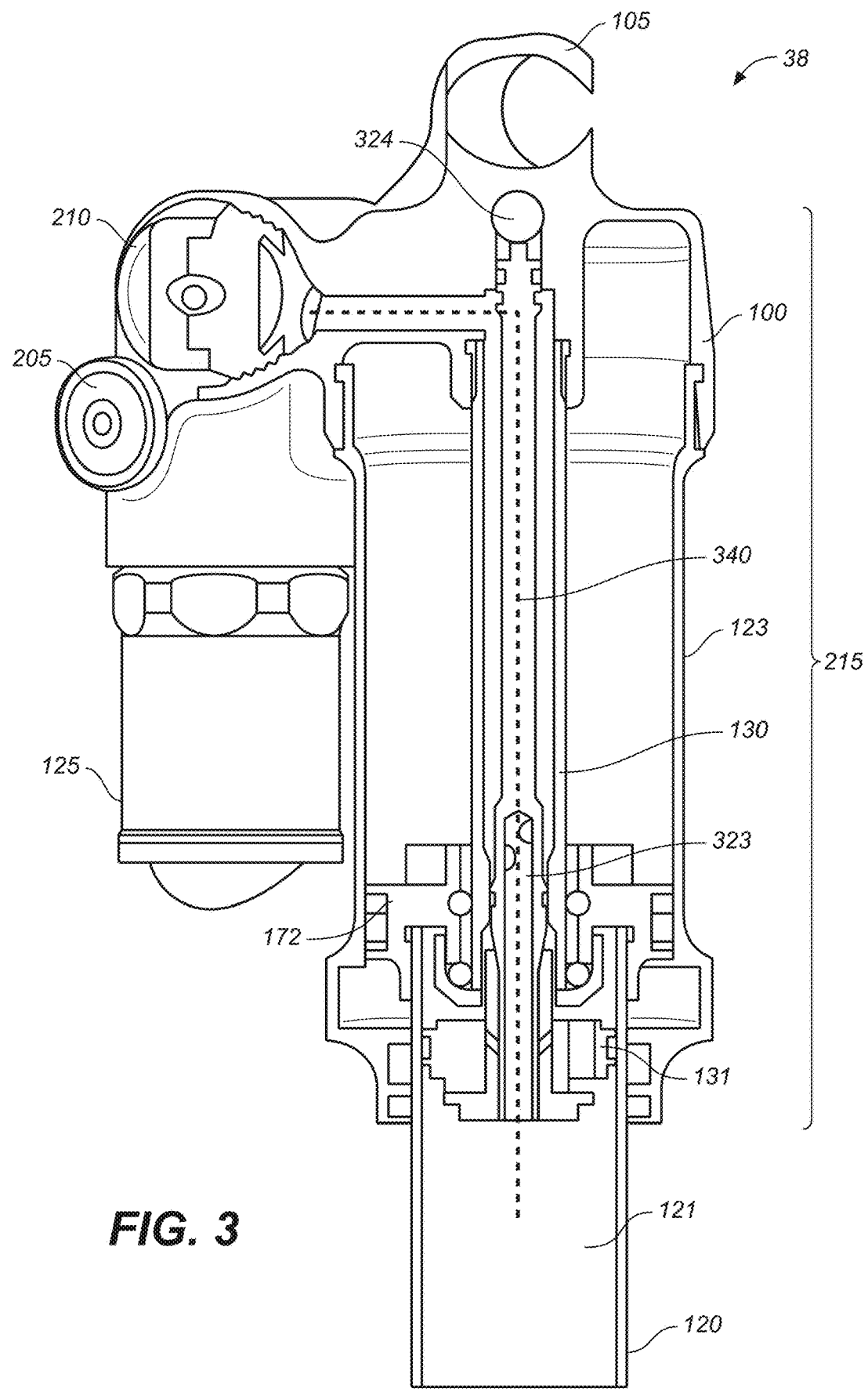
FIG. 3 is a side view of the upper portion of the adjustable shock assembly including a cutaway view of the damper body and the adjustable rebound valve assembly, shown in accordance with an embodiment.

With reference now to FIG. 3, a side view of the upper portion of adjustable shock assembly 38 including a cutaway view of the damper body 120 and the adjustable rebound valve assembly 215 is shown in accordance with one embodiment. For purposes of clarity, components of adjustable shock assembly 38 shown in FIG. 3 which are similar to those already discussed in FIG. 2 are not repeated. However, the discussion of FIG. 2 is incorporated by reference. In one embodiment, aspects, components, and views that are shown in more detail in FIG. 3 or include additional operational details will be discussed.

In one embodiment, the cutaway view of the damper body 120 shows main piston 131, piston shaft 130, bearing housing 172, main chamber 121 of damper body 120, and fluid flow path 340 from main chamber 121, through compression adjuster 210, through adjustable active valve assembly 205, and to reservoir 125. In one embodiment, fluid flow path 340 travels through the inside of a portion of piston shaft 130. In one embodiment, fluid flow path 340 does not travel through the inside of a portion of piston shaft 130.

In one embodiment, the cutaway view of the adjustable rebound valve assembly 215 shows the rebound needle adjustable feature 324 (e.g., a manual knob, switch, lever, etc. or an electronic component such as a solenoid, stepper motor, electric motor, or the like) near shaft-end eyelet 105. In one embodiment, the rebound adjustment needle 323, which is adjusted by the rebound needle adjustable feature 324 is located within the hollow piston shaft 130.

During a compression stroke, main piston 131 and shaft 130 will move into the main chamber 121. Within main chamber 121 is a working fluid (or fluid). While the fluid will be able to pass through shims in main piston 131 and/or use a bypass to go around main piston 131 from the compression side to the rebound side within main chamber 121, the volume of the shaft 130 that moves into the main chamber 121 will need to displace the incompressible fluid. Therefore, as the main piston and shaft move into the main chamber, the building pressure will force shaft-displaced fluid to travel along one or more fluid flow paths such as fluid flow path 340, through compression adjuster 210, through adjustable active valve assembly 205 and into reservoir 125.

In contrast, during a rebound stroke, main piston 131 and shaft 130 will move out of the main chamber 121. Here again, while the fluid will be able to pass through shims in main piston 131 and/or use a bypass to go around main piston 131 this time from the rebound side to the compression side within main chamber 121, the volume of the shaft 130 that moves out of main chamber 121 will cause a reduced pressure. Therefore, as the main piston and shaft move out of the main chamber, the reduced pressure will draw fluid from reservoir 125, through adjustable rebound valve assembly 215, and through fluid flow path 340 back into main chamber 121.

Figure 4A:
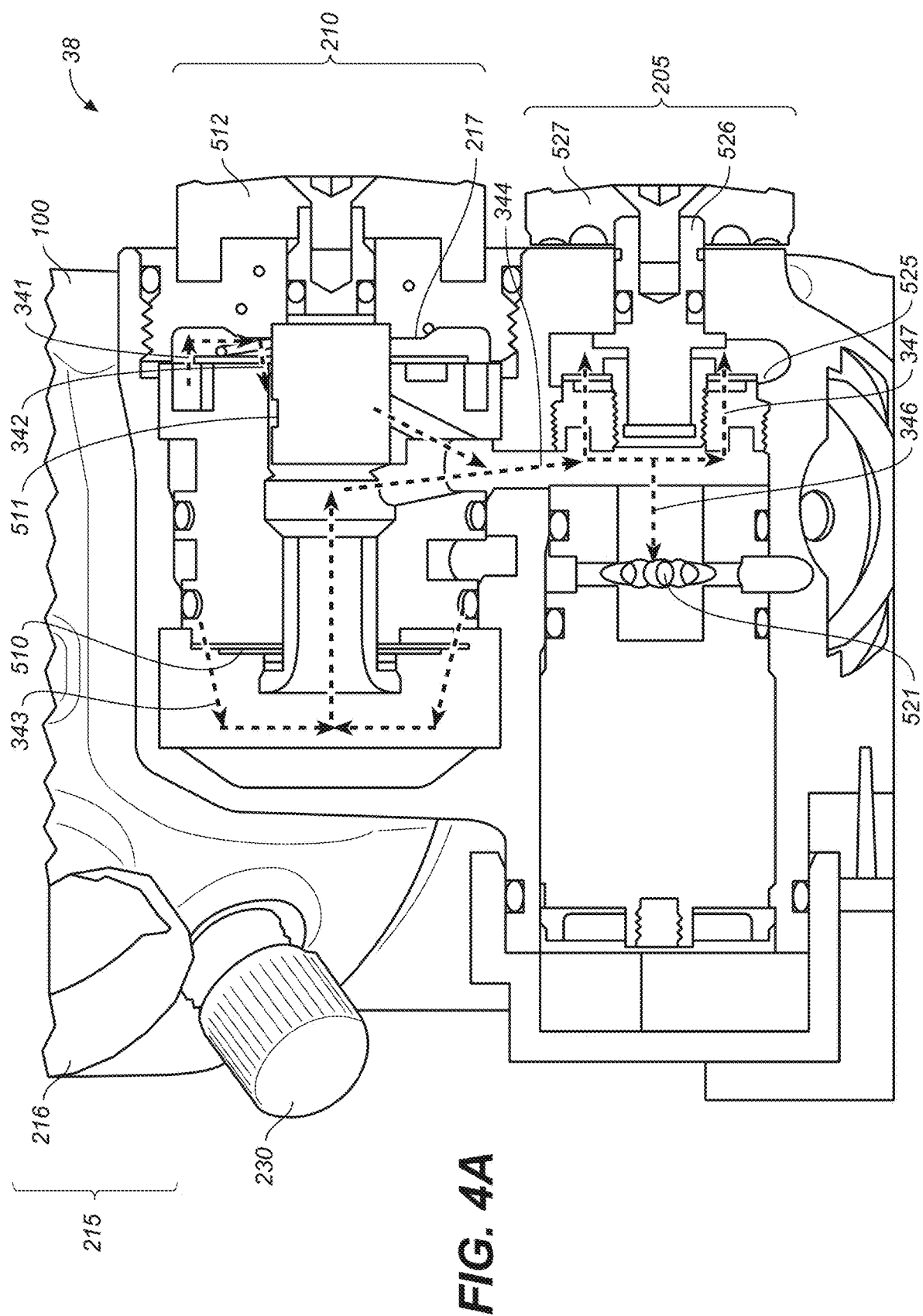
FIG. 4A is a side view of the upper portion of the adjustable shock assembly including a cutaway view of the adjustable active valve assembly and the adjustable compression valve assembly, shown in accordance with an embodiment.

With reference now to FIG. 4A, a side view of the upper portion of adjustable shock assembly 38 including a cutaway view of the adjustable active valve assembly 205 and a cutaway view of the compression adjuster 210 is shown in accordance with one embodiment. For purposes of clarity, components of adjustable shock assembly 38 shown in FIG. 4A which are similar to those already discussed in FIGS. 2 and 3 are not repeated. However, the discussion of FIGS. 2 and 3 are incorporated by reference. In one embodiment, aspects, components, and views that are shown in more detail in FIG. 4A or include additional operational details will be discussed.

In one embodiment, compression adjuster 210 includes adjustable valve 511, compression valve stack 510, and knob 512 for manually adjusting adjustable valve 511. In one embodiment, adjustable valve 511 is a low-speed compression (LSC) adjustable valve. In one embodiment, compression valve stack 510 is a high-speed compression valve stack. In general, low-speed adjustments are used to adjust body motion, shock shaft velocity such as zero to twenty or thirty inches per second. In contrast, high-speed adjustments are used to deal with shock shaft velocities that are greater than twenty to thirty inches per second, such as square edge impacts, and the like. Thus, low-speed adjustments are usually (but not only) used to adjust body motion, while high-speed adjustments are usually (but not only) used to adjust impacts. In one embodiment, an adjuster may adjust across a different range that could include some (or all) of both low-speed and high-speed adjustment ranges.

In one embodiment, adjustable valve 511 may be adjusted by a powered component such as a solenoid, stepper motor, electric motor, or the like. In one embodiment, adjustable valve 511 may be adjusted both manually such as by knob 512 and electrically such as by a solenoid, stepper motor, electric motor, or the like. In one embodiment, adjustable valve 511 (or knob 512) includes one or more hard stops to ensure the adjustable valve 511 isn't rotated too far in either direction. For example, the stops will ensure a user (or electric motor) doesn't over-rotate and deleteriously affect the operation of adjustable valve 511.

In one embodiment, knob 512 will include numbers, arrows, and/or other identifying features that will allow a user to visually identify one or more predefined settings, directions to turn the knob for different performance aspects, and the like. In one embodiment, knob 512 will include dents, grooves, or the like that will provide haptic feedback to a user turning the knob. In one embodiment, knob 512 will include a range shifting capability to allow the range of the adjustment of adjustable valve 511 to be modified.

In one embodiment, the shaft-displaced fluid flow path shown in FIG. 3 enters into compression adjuster 210 as indicated by flow path arrows 341. At that point, the flow of shaft-displaced fluid will follow one or both of parallel flow paths 342 and 343. In one embodiment, parallel flow path 342 includes adjustable valve 511 while parallel flow path 343 includes compression valve stack 510. The operation of compression adjuster 210 and its associated fluid flow are described in more detail in the schematic discussion herein.

In one embodiment, adjustable active valve assembly 205 includes active valve 521, firm mode blowoff stack 525, firm mode adjuster 526, and knob 527 for manually adjusting firm mode adjuster 526. In one embodiment, firm mode adjuster 526 may be adjusted by a powered component such as a solenoid, stepper motor, electric motor, or the like. In one embodiment, firm mode adjuster 526 may be adjusted both manually such as by knob 527 and electrically such as by a solenoid, stepper motor, electric motor, or the like. In one embodiment, firm mode adjuster 526 (or knob 527) includes one or more stops to stop the firm mode adjuster 526 from rotating too far in either direction. For example, the stops will ensure a user (or electric motor) doesn't over-rotate and deleteriously affect the operation of firm mode adjuster 526, such as by setting the blowoff pressure of firm mode blowoff stack 525 past its operational limits, and the like.

In one embodiment, knob 527 will include numbers, arrows, and/or other identifying features that will allow a user to visually identify one or more predefined settings, directions to turn the knob for different performance aspects, and the like. In one embodiment, knob 527 will include dents, grooves, or the like that will provide haptic feedback to a user turning the knob. In one embodiment, knob 527 will include a range shifting capability to allow the range of the adjustment of firm mode adjuster 526 to be modified.

In one embodiment, the shaft-displaced fluid flow enters into adjustable active valve assembly 205 from compression adjuster 210 as indicated by flow path arrows 344. At that point, the flow of shaft-displaced fluid will follow one or both of parallel flow paths 346 and 347. In one embodiment, parallel flow path 346 includes active valve 521 while parallel flow path 347 includes firm mode blowoff stack 525. The operation of adjustable active valve assembly 205 and its associated fluid flow are described in more detail in the schematic discussion herein.

In one embodiment, adjustable rebound valve assembly 215 also includes a spring loaded shim 217 and knob 216. In one embodiment, spring loaded shim 217 is used to keep the rebound flow path closed during the compression stroke. However, when the shock assembly 38 starts a rebound stroke, the fluid will flow back from reservoir 125 lift the spring loaded shim 217 and flow along flow path 340 into main chamber 121.

In one embodiment, adjustable rebound valve assembly 215 may be adjusted both manually such as by knob 216 and electrically such as by a solenoid, stepper motor, electric motor, or the like. In one embodiment, knob 216 includes one or more stops to stop a user from rotating adjustable rebound valve assembly 215 too far in either direction. For example, the stops will ensure a user (or electric motor) doesn't over-rotate knob 216 deleteriously affecting the operation of adjustable rebound valve assembly 215, such as by setting the adjustable rebound valve assembly 215 past its operational limits, or the like.

In one embodiment, knob 216 will include numbers, arrows, and/or other identifying features that will allow a user to visually identify one or more predefined settings, directions to turn the knob for different performance aspects, and the like. In one embodiment, knob 216 will include dents, grooves, or the like that will provide haptic feedback to a user turning the knob. In one embodiment, knob 216 will include a range shifting capability to allow the range of the adjustment of adjustable rebound valve assembly 215 to be modified.

Figure 4B:
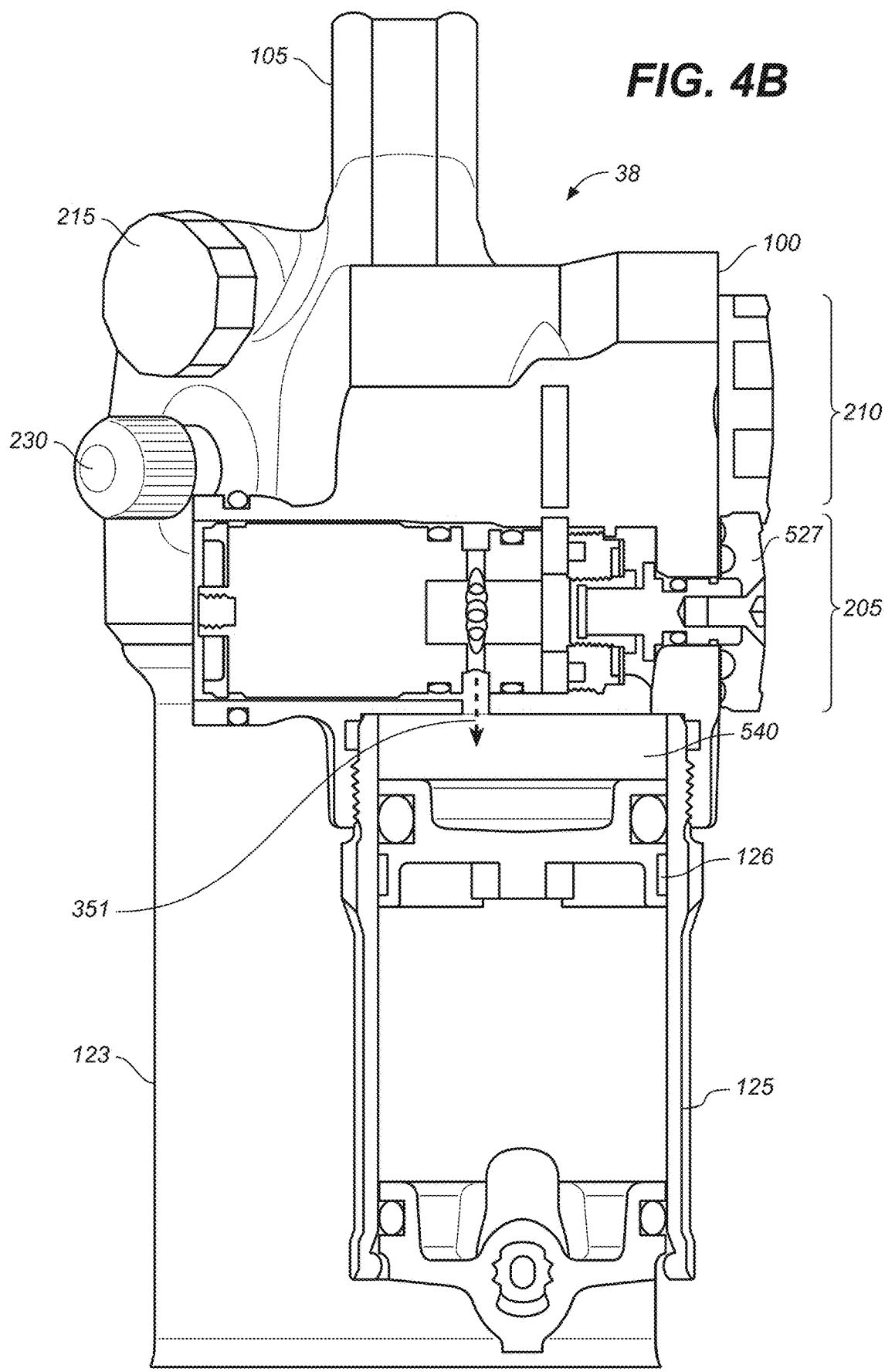
FIG. 4B is a side view of the adjustable shock assembly including a cutaway portion of a reservoir, shown in accordance with one embodiment is shown in accordance with an embodiment.

With reference now to FIG. 4B, a side view of adjustable shock assembly 38 including a cutaway portion of reservoir 125 and a cutaway portion of adjustable active valve assembly 205 is shown in accordance with one embodiment. For purposes of clarity, components of adjustable shock assembly 38 shown in FIG. 4B which are similar to those already discussed in FIGS. 2, 3 and 4A are not repeated. However, the discussion of FIGS. 2, 3, and 4A are incorporated by reference. In one embodiment, aspects, components, and views that are shown in more detail in FIG. 4B or include additional operational details will be discussed.

In one embodiment, the shaft-displaced fluid flow enters into reservoir 125 from adjustable active valve assembly 205 as indicated by flow path arrow 351.

In one embodiment, reservoir 125 includes an internal floating piston (IFP) 126 that separates the working fluid in the reservoir 125 from an amount of pressurized gas. In general, the reservoir is used to store any shaft-displaced fluid due to a compression event that causes the piston shaft 130 (of FIG. 3) to move into the main chamber 121 of damper body 120. As described herein, when the piston shaft 130 moves into main chamber 121 it reduces the volume available in main chamber 121. Prior to the piston shaft 130 incursion, that volume was used to contain the working fluid, during the piston shaft 130 incursion, the reduced volume results in the displacement of the fluid from the main chamber 121 to the reservoir 125 (i.e., shaft-displaced fluid). In one embodiment, fluid communication between the main chamber 121 of damper body 120 and the reservoir 125 may be via fluid flow pathways controlled by one, two, or all three of the adjustable active valve assembly 205, compression adjuster 210 and adjustable rebound valve assembly 215.

Additional descriptions and details of reservoir 125, including at least a reservoir housing and IFP 126, are described in U.S. Pat. No. 7,374,028 the content of which is incorporated by reference herein, in its entirety.

Schematic Diagram

Figure 5:
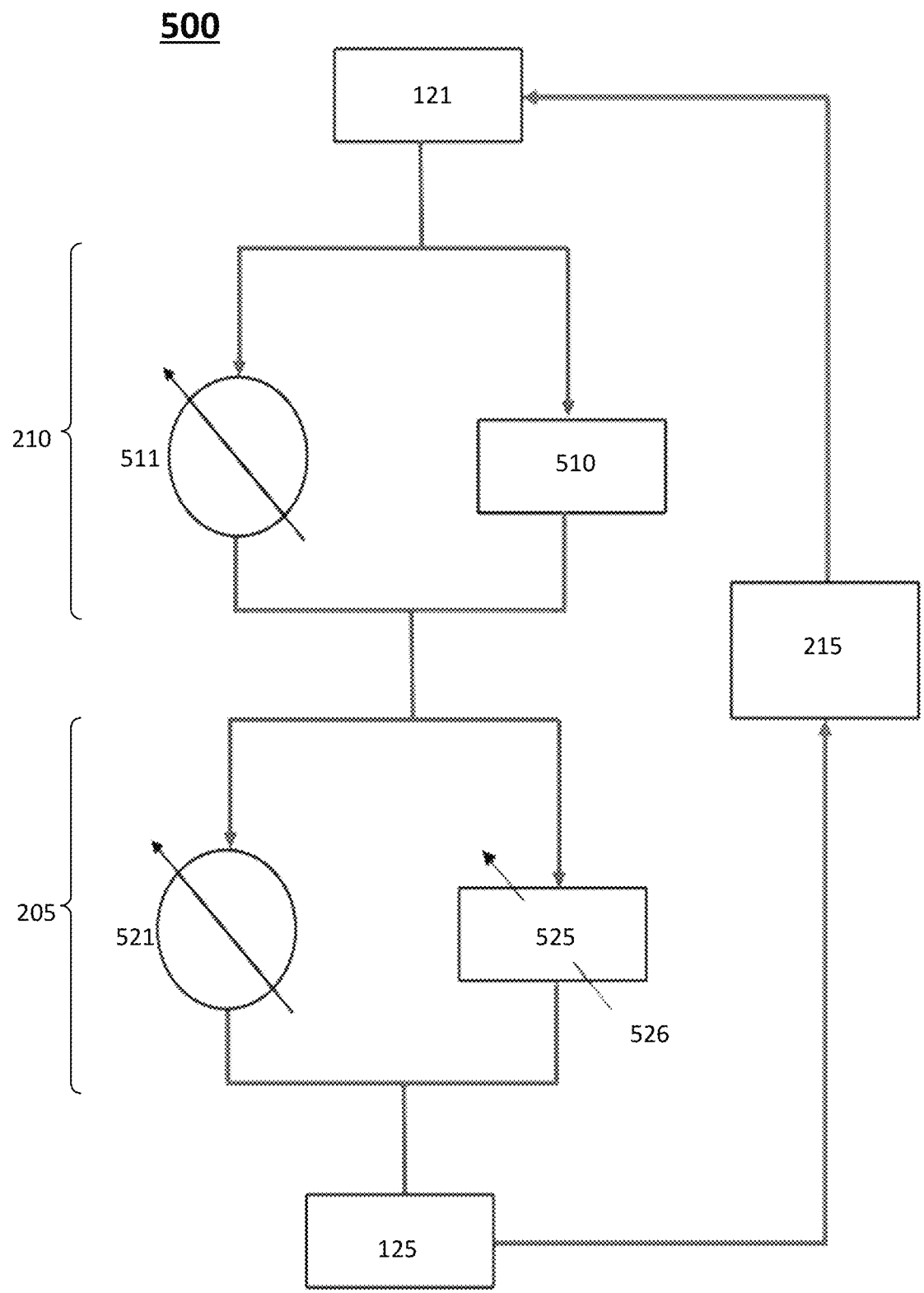
FIG. 5 is a schematic diagram of the fluid flow in the adjustable shock assembly, shown in accordance with an embodiment.

With reference now to FIG. 5, a schematic diagram 500 of the fluid flow in the adjustable shock assembly 38 is shown in accordance with an embodiment. For purposes of clarity, the schematic diagram 500 of FIG. 5 is discussed in conjunction with the features of FIGS. 2-4B. In one embodiment, schematic diagram 500 includes main chamber 121, compression adjuster 210, adjustable active valve assembly 205, reservoir 125, and adjustable rebound valve assembly 215.

In one embodiment, when shock assembly 38 is undergoing a compression stroke, the shaft-displaced fluid will flow from the main chamber 121, and into compression adjuster 210.

In one embodiment, compression adjuster 210 includes at least two parallel flow paths and provides an adjustable damping capability when shock assembly 38 is in an open mode. In one embodiment, one of the parallel flow paths includes an adjustable valve 511 flow control feature while the other parallel flow path includes a compression valve stack 510 flow control feature.

Once the fluid has passed through one or more of the at least two parallel flow paths, the fluid will leave compression adjuster 210. In one embodiment, the two parallel fluid flow pathways join back together as (or before) the fluid leaves compression adjuster 210.

Once the fluid leaves compression adjuster 210 it continues traversing the flow path(s) until some or all of it enters adjustable active valve assembly 205.

In one embodiment, adjustable active valve assembly 205 includes at least two parallel flow paths. In one embodiment, one of the parallel flow paths includes an active valve 521 flow control feature while the other parallel flow path includes both a firm mode blowoff stack 525 and a firm mode adjuster 526 flow control features.

Once the fluid has passed through one or more of the at least two parallel flow paths, the fluid will leave adjustable active valve assembly 205. In one embodiment, the two parallel fluid flow pathways join back together as (or before) the fluid leaves adjustable active valve assembly 205.

After the fluid leaves adjustable active valve assembly 205 it will continue along one or more fluid pathways until it reaches reservoir 125. In one embodiment, reservoir 125 includes IFP 126 separating the fluid from a gas charge.

During a rebound stroke, the fluid flows from the reservoir 125 along one or more rebound fluid pathways back to main chamber 121. In one embodiment, the rebound fluid pathway(s) are controlled by an adjustable rebound valve assembly 215. In one embodiment, adjustable rebound valve assembly 215 includes a compression check valve 217 such that the fluid can bypass the compression valve assemblies (e.g., adjustable active valve assembly 205 and compression adjuster 210) when flowing from the reservoir 125 to the main chamber 121 during the rebound stroke. In one embodiment adjustable rebound valve assembly 215 is a radially varying compression adjuster. In one embodiment, adjustable rebound valve assembly 215 may be similar to adjustable active valve assembly 205 or compression adjuster 210 thereby providing adjustable rebound damping characteristics.

Although schematic diagram 500 shows different configurations for and/or components for compression adjuster 210, adjustable active valve assembly 205, and adjustable rebound valve assembly 215, the schematic is used to represent one or more embodiments and is provided for purposes of clarity. However, it should be appreciated that in other embodiment, different flow control features may be used in the different pathways.

For example, with respect to compression adjuster 210, in one embodiment, compression adjuster 210 includes at least two parallel flow paths. In one embodiment, one of the parallel flow paths will include the adjustable valve 511 (or the active valve 521) flow control feature while the other parallel flow path will include both the compression valve stack 510 flow control feature and a compression valve stack adjuster (similar in functionality/operation to the firm mode adjuster 526 such that the firmness of the compression valve stack 510 may be adjusted manually and/or automatically) flow control features.

In yet another embodiment, compression adjuster 210 will include at least three parallel flow paths. In one embodiment, one of the parallel flow paths will include the adjustable valve 511 (or the active valve 521) flow control feature, another of the parallel flow paths will include the compression valve stack 510 flow control feature, and yet another parallel flow path will include both the compression valve stack 510 and the compression valve stack adjuster flow control features.

In yet another embodiment, compression adjuster 210 will include at least four parallel flow paths. In one embodiment, one of the parallel flow paths will include the adjustable valve 511 flow control feature, another of the parallel flow paths will include the active valve 521 flow control feature, another of the parallel flow paths will include the compression valve stack 510 flow control feature, and yet another parallel flow path will include both the compression valve stack 510 and the compression valve stack adjuster flow control features.

Similarly, with respect to adjustable active valve assembly 205, in one embodiment, adjustable active valve assembly 205 includes at least two parallel flow paths. In one embodiment, one of the parallel flow paths will include the active valve 521 (or the adjustable valve 511) flow control feature while the other parallel flow path will include the firm mode blowoff stack 525 without the firm mode adjuster 526 flow control features.

In another embodiment, adjustable active valve assembly 205 will include at least three parallel flow paths. In one embodiment, one of the parallel flow paths will include the active valve 521 (or the adjustable valve 511) flow control feature, another of the parallel flow paths will include the firm mode blowoff stack 525 without the firm mode adjuster 526 flow control features, and yet another parallel flow path will include both the firm mode blowoff stack 525 and the firm mode adjuster 526 flow control features.

In yet another embodiment, adjustable active valve assembly 205 will include at least four parallel flow paths. In one embodiment, one of the parallel flow paths will include the active valve 521 flow control feature, another of the parallel flow paths will include the adjustable valve 511 flow control feature, another of the parallel flow paths will include the firm mode blowoff stack 525 without the firm mode adjuster 526 flow control features, and yet another parallel flow path will include both the firm mode blowoff stack 525 and the firm mode adjuster 526 flow control features.

With respect to adjustable rebound valve assembly 215, in different embodiments, adjustable rebound valve assembly 215 may include any of the flow paths and features recited in the embodiments of compression adjuster 210 and/or adjustable active valve assembly 205 disclosed herein.

It should also be appreciated that in different embodiments, shock assembly 38 may include any variation of the compression adjuster 210 described herein (including the number of parallel pathways and their associated flow control features), as well as any variation of the adjustable active valve assembly 205 described herein (including the number of parallel pathways and their associated flow control features), and any variation of the adjustable rebound valve assembly 215 described herein (including the number of parallel pathways and their associated flow control features).

For example, the variations to one, some, or all of compression adjuster 210, adjustable active valve assembly 205, and/or adjustable rebound valve assembly 215 may be used to provide different levels/adjustability ranges/performance results, and the like for the compression and/or rebound tuning characteristics for similar or different vehicles. The different iterative variations of one, some, or all of compression adjuster 210, adjustable active valve assembly 205, and/or adjustable rebound valve assembly 215 would be driven by aspects such as, but not limited to, vehicle cost, vehicle use/performance requirements (e.g., on-road, off-road, gravel/dirt roads/trails/paths, downhill terrain, rough terrain (e.g., rocky, rutty, obstacle inclusive, sand, etc.) water, air, terrestrial, extra-terrestrial, etc.), and the like.

Thus, as described in further detail below, and as shown in schematic diagram 500 (and FIGS. 2-4B) the amount of damping and on-the-fly damping adjustability available to shock assembly 38 is no longer dependent upon either adjustable active valve assembly 205, compression adjuster 210, or any other single component. Instead, the amount of damping and on-the-fly damping adjustability available to shock assembly 38 is enhanced by the combined, individually tunable characteristics, of adjustable active valve assembly 205 and/or compression adjuster 210.

For example, the damping provided by adjustable active valve assembly 205 is modified and/or biased by the additional damping changes provided by the combination of the fluid passing through compression adjuster 210 and then through adjustable active valve assembly 205 (or vice-versa, e.g., the fluid passing through adjustable active valve assembly 205 and then through compression adjuster 210). For example, in one embodiment, a user is able to bias the closed (or partially closed) mode of one of adjustable active valve assembly 205 or compression adjuster 210 with an open (or partially open) mode of the other of adjustable active valve assembly 205 or compression adjuster 210. Such a capability is useful in allowing a user (or controller, application, computing device, or the like) to obtain further compression (and/or rebound) control granularity of the damping characteristics of shock assembly 38.

In one embodiment, compression adjuster 210 and adjustable active valve assembly 205 may be arranged in parallel as opposed to the depicted serial configuration.

In one embodiment, active valve 521, adjustable valve 511, firm mode adjuster 526, compression valve stack adjuster flow control, and/or other components of shock assembly 38 are electronically and/or manually adjustable to include being turned on, turned off, opened, partially opened, closed, or the like.

In one embodiment, one, some, or all of active valve 521, adjustable valve 511, firm mode adjuster 526, compression valve stack adjuster flow control, and/or other components of shock assembly 38 include an externally adjustable feature, such as a knob, button, lever, switch, or the like which can be manually manipulated by a user to change one or a plurality of damping characteristics of shock assembly 38.

In one embodiment, one, some, or all of active valve 521, adjustable valve 511, firm mode adjuster 526, compression valve stack adjuster flow control, and/or other components of shock assembly 38 include one or more electronically adjustable features, such as a solenoid, stepper motor, electric motor, or the like to seat or unseat a valve needle (or poppit, plug, etc.) with respect to a valve seat (or orifice).

In one embodiment, the active valve 521, adjustable valve 511, firm mode adjuster 526, compression valve stack adjuster flow control, and/or other components of shock assembly 38 will receive one or more adjustment. The one or more adjustment inputs will cause the electronically adjustable component to adjust the position of the valve needle with respect to the valve seat (which will cause the fluid pathway flow characteristics to change as the fluid pathway will be closed, opened, partially opened, or partially closed), thereby modifying one or more damping characteristics of shock assembly 38.

In one embodiment, the adjustment inputs are received via a wired or wireless electronic communication from one or more devices such as, but not limited to, controller 39, switch 93 (or the like), mobile device 95 (e.g., a laptop, tablet, computer, smart watch, smart jewelry), sensor 35, or the like as discussed previously. In one embodiment, the device providing the adjustment input may be integrated with shock assembly 38.

Adjustable Active Valve Assembly 205

With reference now to FIGS. 4A, 4B, and 5, in one embodiment, adjustable active valve assembly 205 includes an active valve 521, a firm mode blowoff stack 525, and a firm mode adjuster 526 to adjust the blowoff pressure of firm mode blowoff stack 525.

In one embodiment, firm mode adjuster 526 is used to (manually, electronically, remotely, or a combination thereof) adjust the blowoff pressure of firm mode blowoff stack 525.

Although a number of electronically adjustable components have been described herein, for purposes of clarity, the following discussion will refer to the electronically adjustable components in an embodiment of a solenoid to seat or unseat a needle with respect to a valve seat. However, it should be appreciated that in other embodiments, other types of electronically adjustable components may be used. The use of the solenoid, needle, and valve seat are provided as one embodiment and for purposes of clarity.

When the active valve 521 is in a closed configuration, the needle is seated against the valve seat such that the fluid flow through the parallel flow path including active valve 521 would be in its most restricted flow state. In so doing, a substantial volume (e.g., a preponderance, majority, most, all, etc.) of the fluid flowing through adjustable active valve assembly 205 would be flowing through the parallel flow path including firm mode blowoff stack 525.

In contrast, when the active valve 521 is in a fully (or nearly fully) open configuration, the needle is moved its furthest distance away from the valve seat and a substantial volume (e.g., most, a substantial volume e.g., most, a preponderance, a majority, or possibly all) of the fluid that flows through adjustable active valve assembly 205 is able to flow through the parallel flow path including fully (or nearly fully) open active valve 521 and, as such, may not require the use of the parallel flow path including firm mode blowoff stack 525.

In one embodiment, active valve 521 only has a closed position and a full-open (or nearly full-open) position.

In one embodiment, active valve 521 will include a number of positions including the closed position and the full-open (or nearly full-open) position. In general, by adjusting the distance between the needle and the valve seat, the percentage of the fluid flow rate that can flow through the parallel flow path including active valve 521 and thereby bypass the parallel flow path including firm mode blowoff stack 525 is also adjustable.

In one embodiment, there may be predefined number of positions, e.g., closed, half-open, fully open (or nearly full-open). In such an embodiment, the position of the needle with respect to the valve seat will selectively be: fully seated (closed), halfway or partially unseated (partially open), or fully unseated (full-open or nearly full-open).

In one embodiment, the active valve 521 is infinitely adjustable. That is, the distance between the needle and the valve seat can be adjusted to any point between the closed (or minimum flow rate) position and the full-open (or nearly full-open) position. In so doing, the percentage of the fluid flow rate that flows through the parallel flow path including active valve 521 and the parallel flow path including firm mode blowoff stack 525 can be infinitely adjusted thereby providing nuanced adjustment capabilities of the damping characteristics of shock assembly 38. In one embodiment, adjustable active valve assembly 205 (or one or more components thereof) can be adjusted by inputs received from the user by physical manipulation or via electronic transmission and/or automatically by automatic inputs generated by the controller 39, sensor 35, and/or other electronic devices.

In one embodiment, the fixed size of the flow path(s) and openings (e.g., orifice openings) of the active valve 521 provide a high fluid flow rate without causing an excessive pressure drop. In other words, when completely opened, the parallel flow path including active valve 521 is capable of supporting the flow of a substantial volume (e.g., all, most, a preponderance, etc.) of the fluid passing through adjustable active valve assembly 205 such that no pressure drop is built (or occurs), while also providing a complete (or nearly complete) bypass around the parallel flow path including firm mode blowoff stack 525.

For example, with reference to schematic diagram 500, when active valve 521 is fully open (or nearly fully-open), displaced fluid flows from the main chamber 121 through compression adjuster 210 and then into adjustable active valve assembly 205 where the full (or nearly full) flow (or in other embodiments, more than three-quarters of the flow, more than two-thirds of the flow, or the like.) of the fluid is able to pass through the parallel flow path including active valve 521 and continue into the reservoir 125. Thus, when active valve 521 is in the fully open (or nearly fully-open) state, there is a reduced amount (e.g., little or no) of restriction to the fluid flow as it moves through the adjustable active valve assembly 205.

In contrast, when active valve 521 is closed, displaced fluid still flows from the main chamber 121 through compression adjuster 210 and then into adjustable active valve assembly 205. However, at adjustable active valve assembly 205, the fluid is blocked from flowing through the parallel flow path including closed active valve 521 and instead has to pass through the parallel flow path including firm mode blowoff stack circuit 525 before continuing into the reservoir 125.

The closed (or partially closed) active valve 521 will impede or slow the total amount of fluid flowing through adjustable active valve assembly 205 thereby reducing the amount of shaft-displaced fluid that is exiting the main chamber 121 through fluid pathway 340. This reduction in the amount of shaft-displaced fluid exiting the main chamber 121 (for a given pressure) will slow the movement of main piston 131 into the main chamber 121. However, while the movement of main piston 131 is slowed, it is still in compression and still moving. As such, the pressure being applied to the fluid by the increasing volume of the shaft 130 as it continues to move into the main chamber 121 will increase. The increased pressure on the fluid in the main chamber will increase the pressure that the shaft-displaced fluid is applying to the firm mode blowoff stack circuit 525 of adjustable active valve assembly 205 which will allow more fluid to pass therethrough. In so doing, the compression damping firmness of shock assembly 38 will be increased.

Similarly, when the active valve 521 is moved from a closed (or partially closed) state to an opened (or partially opened) state, the amount of fluid that can flow through active valve 521 over a given time period (for a given pressure) will increase (as more fluid can bypass the firm mode blowoff stack circuit 525). This will result in an increase in the amount of shaft-displaced fluid that is able to exit the main chamber 121 through fluid pathway 340 (for a given pressure) which will allow main piston 131 and shaft 130 to more easily move into the main chamber 121 as the fluid pressure caused by the increasing volume of the shaft 130 as it continues to move into the main chamber 121 will have been reduced. In so doing, the compression damping firmness of shock assembly 38 will be decreased.

In one embodiment, firm mode blowoff stack 525 includes firm-mode adjuster 526 which may have an externally adjustable user manipulatable features (e.g., a knob, switch, lever, etc.) and/or an electrically controlled solenoid that allows a user to manually adjust (and/or a controller, sensor, computer device, or the like to automatically adjust) the blowoff pressure (or other characteristics) of the firm mode blowoff stack 525 and thus the damping characteristics of shock assembly 38.

For example, if active valve 521 is full-open (or nearly full-open), there is a reduced amount (similar to the flow volume described in the lockout description herein) shaft-displaced fluid flowing through the parallel flow path including firm mode blowoff stack 525, and as such, any changes made to the blowoff pressure of firm mode blowoff stack 525 by firm-mode adjuster 526 would be immaterial.

However, if active valve 521 is not full-open (or nearly full-open), there will be some amount of shaft-displaced fluid flowing through the parallel flow path including firm mode blowoff stack 525. As such, firm mode adjuster 526 could be adjusted manually and/or electronically via a user or automatically, to increase or decrease the blowoff pressure of the firm mode blowoff stack 525. In one embodiment, if firm mode adjuster 526 increases the blowoff pressure of the firm mode blowoff stack 525, then similar to the closed (or partially closed) active valve 521 example above, the shaft-displaced fluid flow will decrease (or the pressure necessary to move the fluid through the firm mode blowoff stack 525 will increase) causing the compression damping characteristics of shock assembly 38 to become firmer.

In contrast, if firm mode adjuster 526 decreases the blowoff pressure of the firm mode blowoff stack 525, then similar to the example above where the active valve 521 is moved from a closed (or partially closed) state to partially opened (or more partially opened) state, the shaft-displaced fluid flow will increase (or the pressure necessary to move the fluid through the firm mode blowoff stack 525 will decrease) causing the compression damping characteristics of shock assembly 38 to become softer.

Compression Adjuster 210

With reference now to FIGS. 4A and 5, in one embodiment, compression adjuster 210 includes an adjustable valve 511 and a compression valve stack 510. In one embodiment, adjustable valve 511 is manually adjustable from a minimum flow configuration to a high flow configuration without an excessive pressure drop. In one embodiment, adjustable valve 511 is automatically adjustable from a minimum flow configuration to a high flow configuration without an excessive pressure drop. In one embodiment, adjustable valve 511 can be include a combination of manually adjustable and automatically adjustable valving to adjust the flow rate therethrough from a minimum flow configuration to a high flow configuration without an excessive pressure drop. Unless otherwise stated, the operation of adjustable valve 511 is similar to that of active valve 521 which is incorporated by reference herein, and as such is not repeated in its entirety for purposes of clarity.

In one embodiment, when adjustable valve 511 is closed, a substantial volume (e.g., all, almost all, more than three-quarters of the flow, more than two-thirds of the flow, or the like) of the fluid that flows through compression adjuster 210 will have to flow through the parallel flow path including compression valve stack 510. In contrast, when the adjustable valve 511 is fully open (or nearly fully-open)the fluid moving through compression adjuster 210 will flow through the parallel flow path including adjustable valve 511 and mostly (or completely) bypass the parallel flow path including compression valve stack 510. When adjustable valve 511 is partially opened some of the fluid will flow through the parallel flow path including adjustable valve 511 and some of the fluid will flow through the parallel flow path including compression valve stack 510. Thus, similar to the operation of adjustable active valve assembly 205 described above, in one embodiment, the low-speed compression characteristics of shock assembly 38 can be manually and/or automatically adjusted by opening, closing, or partially closing adjustable valve 511.

In one embodiment, with reference to schematic diagram 500, when the adjustable valve 511 is open, displaced fluid flows into compression adjuster 210 where the full (or nearly full) flow (or in other embodiments, more than three-quarters of the flow, more than two-thirds of the flow, or the like) will pass through the parallel flow path including adjustable valve 511 and bypass the parallel flow path including compression valve stack 510. The fluid will then flow into and through adjustable active valve assembly 205 before it continues into reservoir 125. Thus, in the open state of adjustable valve 511, there are reduced restrictions on the fluid flow as it passes through compression adjuster 210. In the open state, the compression damping firmness of shock assembly 38 will be decreased.

In contrast, when the adjustable valve 511 is closed, displaced fluid is blocked from flowing through the parallel flow path including adjustable valve 511 and will have to flow through the parallel flow path including compression valve stack 510 before it can leave compression adjuster 210.

Similarly, when the adjustable valve 511 is partially opened, some of the displaced fluid will be able to flow through the parallel flow path including adjustable valve 511 and some of the displaced fluid will have to flow through the parallel flow path including compression valve stack 510 before it can leave compression adjuster 210.

Thus, by modifying the opening of adjustable valve 511, a user and/or an electronic device can manually and/or automatically control the amount of fluid that is able to flow unrestrictedly through the parallel flow path including adjustable valve 511 and consequentially the amount of shaft-displaced fluid that must flow through the parallel flow path including compression valve stack 510. This control of the fluid flow rate (for a given pressure) through the parallel flow paths will allow the user and or the electronic device to increase or decrease the firmness of shock assembly 38 depending upon whether the flow is more or less restricted.

Therefore, similar to the discussion above with respect to active valve 521, adjusting the opening of adjustable valve 511 to a larger (e.g., full-open or nearly full-open) size will cause a decrease in the compression damping firmness of shock assembly 38. In contrast, adjusting the opening of adjustable valve 511 to a smaller (or closed) size will cause an increase in the compression damping firmness of shock assembly 38.

As such, compression adjuster 210 will provide adjustable compression damping which can be used to create a softer or firmer characteristic of shock assembly 38 during the compression stroke.

In one embodiment, adjustable rebound valve assembly 215 includes a compression check valve such that the fluid can only flow from the reservoir 125 to the main chamber 121 during the rebound stroke. In one embodiment adjustable rebound valve assembly 215 is a radially varying compression adjuster. In one embodiment, adjustable rebound valve assembly 215 may be similar to adjustable active valve assembly 205 or compression adjuster 210 thereby providing adjustable rebound damping characteristics.

In one embodiment, by placing the compression adjuster 210 and the adjustable active valve assembly 205 in series, a user can manually (e.g., externally and/or electronically) adjust a number of damping characteristic of the shock assembly 38 on the fly. In one embodiment, by placing the compression adjuster 210 and the adjustable active valve assembly 205 in series, a controller or other electronic device can automatically adjust a number of damping characteristic of the shock assembly 38 on the fly. In one embodiment, by placing the compression adjuster 210 and the adjustable active valve assembly 205 in series, a user and a controller, or other electronic device, can manually and/or automatically adjust one or both of the open characteristic and closed characteristic of the shock assembly 38.

Moreover, in one embodiment, a number of damping characteristics that were previously only adjustable by tearing down and modifying the shock assembly 38 are now available to be adjusted on the fly manually and/or automatically. In addition, since the compression adjuster 210 and the adjustable active valve assembly 205 are in series, even finer tuning of the compression damping characteristics of shock assembly 38 is possible, as each of the compression adjuster 210 and the adjustable active valve assembly 205 are capable of being adjusted independently and then further adjusted based on the added interaction that is now occurring therebetween. In other words, the closed mode damping is additive to the setting selected for the open mode state which can be more intuitive for the user.

Initial Set Up/Tuning

The following is one example for tuning the shock assembly 38 having the compression adjuster 210 and the adjustable active valve assembly 205 in series. Initially, the user will turn off the controller 39 which will open the active valve 521 and put the adjustable active valve assembly 205 in an open state (or open mode). The user will then find a downhill track/trail and as they ride down the hill, they will adjust the compression adjuster 210, e.g., by using knob 512 to adjust the adjustable valve 511. The user will continue adjusting the adjustable valve 511 until they identify their preferred downhill vehicle performance. Once the user is satisfied with the performance of the vehicle (and shock assembly 38) in downhill and in active or bumpy situations, the compression adjuster 210 setting is basically established for the given user.

Once the compression adjuster 210 is tuned, the user will turn the controller 39 back on which will close the active valve 521 and put the adjustable active valve assembly 205 in a closed state (or closed mode). The user will then find a climb or uphill track/trail and as they ride up the hill, they will adjust the settings of adjustable active valve assembly 205, e.g., by using knob 527 to cause firm mode adjuster 526 to adjust the blowoff pressure of firm mode blowoff stack 525. The user will continue using firm mode adjuster 526 to adjust the blowoff pressure of firm mode blowoff stack 525 until they find their preferred climb mode firmness. These settings would then establish the baseline compression adjuster 210 and adjustable active valve assembly 205 tune for the user. At that point, the user would then be able to make additional fine tune adjustments from their baseline depending upon the terrain being traversed, the type of ride (e.g., road, gravel, cross-country, etc.), and the like.

For example, cross country racers might crank the blowoff pressure of firm mode blowoff stack 525 close to full (or nearly full) lockout while an enduro or trail rider might want a bit of compliance so they would set the blowoff pressure of firm mode blowoff stack 525 to less than full (or nearly full) lockout.

In operation, in one embodiment, the active valve 521 would automatically switch, for example during a detected climb, to a closed position to increase firmness to avoid pedal bob. In one embodiment, a user such as, for example, an Enduro rider, may want a slightly less firm damping characteristic during the climb. As such, the Enduro rider could use knob 527 to reduce the blowoff pressure of firm mode blowoff stack 525, and thus, change the damping characteristic of the shock (as previously and automatically selected by the controller 39 automatically closing active valve 521) to obtain a modified damping characteristic or tune that is different than the damping tune automatically set by the controller 39 and/or active valve 521.

Thus, one embodiment provides a user with the capability of manually adjusting the damping characteristics or tune of shock assembly 38 (e.g., when in a firm mode) not previously found in conventional shock absorbers.

Additionally, the inclusion of both the adjustable active valve assembly 205 and the compression adjuster 210 provide a new and previously unknown "additive" component. For example, in one embodiment, compression adjuster 210 is used to achieve a desired compression setting while the adjustable active valve assembly 205 is used to achieve a further compression setting where the two components working together achieve an "additive" damping characteristic that includes a level of granularity that is not found in conventional shock absorbers.

More generally stated, embodiments of the present invention achieve a first compression mode adjustment in combination with a separate firm mode adjustment to obtain a previously unknown level of damper tune granularity. Additionally, embodiments of the present invention, utilize a manual adjustment, an automatic adjustment, and/or various combinations of manual and/or automatic adjustments to achieve the novel damping characteristics of the shock assembly 28.

By providing this post manufacture adjustability the valve sizing (or code) choices selected by the original equipment manufacturer (OEM) and/or an aftermarket manufacturer, technician, mechanic, user, etc. become much less critical. That is, instead of having to build and live with a specific valve having a specific flow rate for a given shock assembly 38, the flow rate for a number of the valves are now adjustable for a number of different damping characteristics after the shock assembly 38 is assembled, installed, and even while the shock assembly 38 is in use.

In one embodiment, as the active valve 521 and adjustable valve 511 comprises larger flow port(s) designed to allow the maximum fluid flow capability of the given valve assembly to pass through the parallel flow path including active valve 521 or adjustable valve 511 when they are fully open (or nearly fully-open), a pilot circuit and/or boost valve arrangement is not required in one, some, or all of the compression adjuster 210, adjustable active valve assembly 205, or adjustable rebound valve assembly 215.

In one embodiment, by not requiring a boost valve arrangement, the shock assembly 38 is a smaller package with fewer parts that a shock assembly with a boost valve arrangement, which will reduce manufacture costs and speed. Moreover, shock assembly 38 as described herein will reduce clunking and provide a faster response time compared to many other shock designs.

Moreover, in one embodiment, the larger flow port design allows the maximum fluid flow capacity without creating excessively high damping including at high shaft velocities. For example, the large flow port(s) ensure that active valve 521 (or adjustable valve 511) does not "clunk" when opening. As such, there is no need to damp (or slow down) the opening of the active valve 521 (or adjustable valve 511) which means shock assembly 38 will be able to properly react to first strike bumps.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The foregoing Description of Embodiments is not intended to be exhaustive or to limit the embodiments to the precise form described. Instead, The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims and their equivalents.

What is claimed is:

1. An adjustable shock assembly comprising:
    a damper body comprising a main chamber with a working fluid therein;
    an adjustable active valve assembly comprising:
        a first parallel flow pathway comprising an active valve; and
        a second parallel flow pathway comprising:
            a firm mode blowoff stack; and
            a firm mode adjuster to adjust a blowoff pressure of said firm mode blowoff stack, wherein said working fluid flows into said adjustable active valve assembly, a portion of said working fluid passes through said first parallel flow pathway, a different portion of said working fluid passes through said second parallel flow pathway, and said working fluid joins back together to exit said adjustable active valve assembly;
    a main piston coupled with a piston shaft; and
    a fluid pathway, said fluid pathway fluidly coupling said main chamber with said adjustable active valve assembly which is fluidly coupled with a reservoir.

2. The adjustable shock assembly of claim 1, further comprising:
    an open mode when said active valve is full-open such that a substantial volume of said working fluid that flows through said adjustable active valve assembly flows through said first parallel flow pathway and bypasses said second parallel flow pathway.

3. The adjustable shock assembly of claim 1, further comprising:
    a firm mode, said firm mode established when said active valve is closed such that a reduced amount of said working fluid that flows through said adjustable active valve assembly flows through said first parallel flow pathway and a substantial volume of said working fluid will flow through said second parallel flow pathway.

4. The adjustable shock assembly of claim 1, further comprising:
    an externally adjustable feature coupled with said firm mode adjuster, wherein said externally adjustable feature is manually manipulatable to adjust a blowoff pressure of said firm mode blowoff stack thereby modifying a damping characteristic of said adjustable active valve assembly.

5. The adjustable shock assembly of claim 1, further comprising:
    an adjustable feature coupled with said firm mode adjuster, wherein said adjustable feature is electronically manipulatable to adjust a blowoff pressure of said firm mode blowoff stack thereby modifying a damping characteristic of said adjustable active valve assembly.

6. The adjustable shock assembly of claim 1, further comprising:
    a compression adjuster comprising:
        a first parallel flow pathway comprising an adjustable valve to control a flow rate of working fluid therethrough; and
        a second parallel flow pathway comprising a compression valve stack to control a flow rate of working fluid therethrough, wherein said compression adjuster is coupled in parallel with said adjustable active valve assembly in said fluid pathway.

7. The adjustable shock assembly of claim 1, further comprising:
- a compression adjuster comprising:
  - a first parallel flow pathway comprising an adjustable valve to control a flow rate of working fluid therethrough; and
  - a second parallel flow pathway comprising a compression valve stack to control a flow rate of working fluid therethrough, wherein said compression adjuster is additively coupled in series with said adjustable active valve assembly in said fluid pathway.

8. The adjustable shock assembly of claim 7, further comprising:
- an externally adjustable feature coupled with said adjustable valve, wherein said externally adjustable feature is manually manipulatable to adjust an open amount of said adjustable valve.

9. The adjustable shock assembly of claim 7, wherein said second parallel flow pathway further comprises:
- a compression valve stack adjuster to adjust a blowoff pressure of said compression valve stack.

10. The adjustable shock assembly of claim 1, further comprising:
- a rebound fluid pathway fluidly coupling said reservoir with said fluid pathway, such that said working fluid flows from said reservoir to said main chamber, said rebound fluid pathway bypassing said adjustable active valve assembly, said rebound fluid pathway comprising:
  - a rebound valve assembly.

11. The adjustable shock assembly of claim 10, wherein said rebound valve assembly comprises:
- a spring loaded shim stack; and
- a rebound valve adjuster to adjust a blowoff pressure of said spring loaded shim stack.

12. The adjustable shock assembly of claim 1, further comprising:
- a controller to automatically adjust at least one setting of said active valve; and
- a power source electrically coupled with said controller and said active valve.

13. An adjustable shock assembly comprising:
- a damper body comprising a main chamber with a working fluid therein;
- a compression adjuster comprising:
  - at least a first parallel flow pathway comprising an adjustable valve; and
  - at least a second parallel flow pathway comprising a compression valve stack;
- an adjustable active valve assembly comprising:
  - at least a first parallel flow pathway and a second parallel flow pathway, said first parallel flow pathway comprising an active valve; and
  - said second parallel flow pathway comprising:
    - a firm mode blowoff stack; and
    - a firm mode adjuster to adjust a blowoff pressure of said firm mode blowoff stack, wherein said working fluid flows into said adjustable active valve assembly, a portion of said working fluid passes through said first parallel flow pathway, a different portion of said working fluid passes through said second parallel flow pathway, and said working fluid joins back together to exit said adjustable active valve assembly;
- a main piston coupled with a piston shaft; and
- a fluid pathway, said fluid pathway to fluidly couple said main chamber with said compression adjuster and said adjustable active valve assembly, and fluidly couple one or both of said compression adjuster and said active valve assembly with a reservoir.

14. The adjustable shock assembly of claim 13, further comprising:
- an open mode when said active valve is full-open such that a substantial volume of said working fluid that flows through said adjustable active valve assembly flows through said first parallel flow pathway and bypasses said second parallel flow pathway.

15. The adjustable shock assembly of claim 13, further comprising:
- a firm mode, said firm mode established when said active valve is closed such that a reduced amount of said working fluid that flows through said adjustable active valve assembly will flow through said first parallel flow pathway and a substantial volume of said working fluid will flow through said second parallel flow pathway.

16. The adjustable shock assembly of claim 13, further comprising:
- an externally adjustable feature coupled with said firm mode adjuster, wherein said externally adjustable feature is manually manipulatable to adjust a blowoff pressure of said firm mode blowoff stack.

17. The adjustable shock assembly of claim 13, wherein said compression adjuster is additively coupled in series with said adjustable active valve assembly in said fluid pathway.

18. The adjustable shock assembly of claim 17, further comprising:
- an externally adjustable feature coupled with said adjustable valve, wherein said externally adjustable feature is manually manipulatable to adjust an open amount of said adjustable valve.

19. The adjustable shock assembly of claim 13, further comprising:
- a rebound fluid pathway fluidly coupling said reservoir with said fluid pathway, such that said working fluid will flow from said reservoir to said main chamber, said rebound fluid pathway comprising:
  - a rebound valve assembly, said rebound valve assembly comprising:
    - a spring loaded shim stack; and
    - a rebound valve adjuster to adjust a blowoff pressure of said spring loaded shim stack.

20. An adjustable shock assembly comprising:
- an air sleeve;
- a damper body comprising a main chamber with a working fluid therein;
- a compression adjuster comprising:
  - at least a first parallel flow pathway comprising an adjustable valve; and
  - at least a second parallel flow pathway comprising a compression valve stack;
- an adjustable active valve assembly additively coupled in series with said compression adjuster, said adjustable active valve assembly comprising:
  - a first parallel flow pathway comprising an active valve to automatically control a flow rate of working fluid therethrough;
  - a second parallel flow pathway comprising:
    - a firm mode blowoff stack to control a flow rate of working fluid therethrough; and
    - a firm mode adjuster to manually adjust a blowoff pressure of said firm mode blowoff stack and adjust a compression characteristic of said adjustable shock assembly; and an externally adjustable feature coupled with said firm mode adjuster, said externally adjustable feature manually manipulatable to adjust a blowoff pressure of said firm mode blowoff stack thereby modifying a damping characteristic of said adjustable active valve assembly, wherein said working fluid flows into said adjustable active valve assembly, a portion of said working fluid passes through said first parallel flow pathway, a different portion of said working fluid passes through said second parallel flow pathway, and said working fluid joins back together to exit said adjustable active valve assembly;

a main piston coupled with a piston shaft; and a fluid pathway, said fluid pathway to move said working fluid from said main chamber, through said adjustable active valve assembly and into a reservoir during a compression stroke when said piston shaft causes an amount of said working fluid to become shaft-displaced working fluid.

* * * * *